United States Patent
Arkhipov et al.

(10) Patent No.: US 9,652,579 B1
(45) Date of Patent: May 16, 2017

(54) METHODS, SYSTEMS, AND COMPUTER PROGRAM PRODUCT FOR IMPLEMENTING DRC CLEAN MULTI-PATTERNING PROCESS NODES WITH PARALLEL FILLS IN ELECTRONIC DESIGNS

(71) Applicant: CADENCE DESIGN SYSTEMS, INC., San Jose, CA (US)

(72) Inventors: Alexandre Arkhipov, San Jose, CA (US); Giles V. Powell, Alameda, CA (US); Roland Ruehl, San Carlos, CA (US); Karun Sharma, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/675,426

(22) Filed: Mar. 31, 2015

(51) Int. Cl.
   G06F 17/50      (2006.01)
(52) U.S. Cl.
   CPC ................... G06F 17/5081 (2013.01)
(58) Field of Classification Search
   CPC ........................................... G06F 17/50
   USPC ................................................ 716/52
   See application file for complete search history.

(56) References Cited

U.S. PATENT DOCUMENTS

| | | | |
|---|---|---|---|
| 5,598,343 A | 1/1997 | Roy | |
| 5,793,643 A | 8/1998 | Cal | |
| 7,191,425 B1 | 3/2007 | Malik | |
| 7,378,195 B2 | 5/2008 | Graur | |
| 8,219,939 B2 | 7/2012 | Schultz | |
| 8,225,239 B2 | 7/2012 | Reed et al. | |
| 8,316,326 B1 | 11/2012 | Pierrat | |
| 8,418,111 B2 | 4/2013 | Chen | |
| 8,448,102 B2 | 5/2013 | Kornachuk | |
| 8,607,183 B2 * | 12/2013 | Melzner | G06F 17/5072 716/126 |
| 8,701,056 B1 | 4/2014 | Friedberg | |
| 8,707,223 B2 | 4/2014 | Blatchford | |
| 8,739,095 B2 | 5/2014 | Cao et al. | |
| 8,782,570 B1 | 7/2014 | Li | |
| 8,799,835 B2 | 8/2014 | Bendicksen et al. | |
| 8,843,867 B2 | 9/2014 | Chase | |

(Continued)

OTHER PUBLICATIONS

Notice of Allowance dated Feb. 8, 2015 for U.S. Appl. No. 14/292,122.

(Continued)

*Primary Examiner* — Thuan Do
(74) *Attorney, Agent, or Firm* — Vista IP Law Group, LLP

(57) ABSTRACT

Disclosed are techniques for implementing parallel fills for electronic designs These techniques identify a shape and one or more neighboring shapes of the shape by searching design data of a region of a layout of an electronic design, classify the shape and the one or more neighboring shapes by examining respective characteristics of and to categorize the shape and the one or more neighboring shapes into one or more classes, implement one or more parallel fill shapes for at least one shape of the shape and the one or more neighboring shapes by aggregating the one or more parallel fill shapes to the at least one shape based in part or in whole upon the one or more classes while automatically satisfying one or more design rules, and perform one or more post-layout operations on the layout including the one or more parallel fill shapes.

20 Claims, 17 Drawing Sheets

(56) References Cited

U.S. PATENT DOCUMENTS

| | | |
|---|---|---|
| 8,871,104 B2 | 10/2014 | Park |
| 8,918,745 B2 | 12/2014 | Wang |
| 8,949,760 B2 | 2/2015 | Birch et al. |
| 8,954,913 B1 | 2/2015 | Yuan |
| 8,959,466 B1 | 2/2015 | Hsu et al. |
| 8,984,465 B1 | 3/2015 | Salowe |
| 9,003,349 B1 | 4/2015 | Salowe |
| 9,117,052 B1 | 8/2015 | Salowe et al. |
| 9,141,751 B2 | 9/2015 | Lee |
| 9,158,883 B2 | 10/2015 | Peng |
| 9,158,885 B1 | 10/2015 | Gray |
| 9,245,082 B2 | 1/2016 | Birch |
| 9,251,299 B1 | 2/2016 | Salowe |
| 9,335,624 B2 | 5/2016 | Lee |
| 9,372,955 B1 | 6/2016 | Lee et al. |
| 9,396,301 B1 | 7/2016 | Lee et al. |
| 2002/0069396 A1 | 6/2002 | Bhattacharya |
| 2003/0005399 A1 | 1/2003 | Igarashi |
| 2008/0028352 A1 | 1/2008 | Birch et al. |
| 2011/0014786 A1 | 1/2011 | Sezginer |
| 2014/0040847 A1 | 2/2014 | Milinichik |
| 2014/0145342 A1 | 5/2014 | Schultz et al. |
| 2015/0234974 A1 | 8/2015 | Dechene |

OTHER PUBLICATIONS

Final Office Action dated Oct. 28, 2015 for U.S. Appl. No. 14/292,166.
Non-Final Office Action dated May 28, 2015 for U.S. Appl. No. 14/292,166.
Notice of Allowance dated Mar. 15, 2016 for U.S. Appl. No. 14/292,166.
Non-Final Office Action dated Mar. 21, 2016 for U.S. Appl. No. 14/318,488.
Notice of Allowance dated Sep. 21, 2016 for U.S. Appl. No. 14/318,488.
Final Office Action dated Oct. 27, 2016 for U.S. Appl. No. 14/231,688.
Non-Final Office Action dated Mar. 29, 2016 for U.S. Appl. No. 14/231,688.
Non-Final Office Action dated Feb. 27, 2017 for U.S Appl. No. 14/675,516.
Ex-parte Quayle Action dated Jan. 27, 2017 for U.S. Appl. No. 14/675,609.

\* cited by examiner

METHODS, SYSTEMS, AND COMPUTER PROGRAM PRODUCT FOR IMPLEMENTING DRC CLEAN MULTI-PATTERNING PROCESS NODES WITH PARALLEL FILLS IN ELECTRONIC DESIGNS

CROSS REFERENCE TO RELATED APPLICATIONS

This application is related to U.S. patent application Ser. No. 14/292,067 entitled "METHOD, SYSTEM, AND COMPUTER PROGRAM PRODUCT FOR IMPLEMENTING TRACK PATTERNS FOR ELECTRONIC CIRCUIT DESIGNS" and filed on May 30, 2014, U.S. patent application Ser. No. 14/292,122 entitled "METHOD, SYSTEM, AND COMPUTER PROGRAM PRODUCT FOR IMPLEMENTING REPETITIVE TRACK PATTERNS FOR ELECTRONIC CIRCUIT DESIGNS" and filed on May 30, 2014, U.S. patent application Ser. No. 14/292,166 entitled "METHOD, SYSTEM, AND COMPUTER PROGRAM PRODUCT FOR INTERCONNECTING CIRCUIT COMPONENTS WITH TRACK PATTERNS FOR ELECTRONIC CIRCUIT DESIGNS" and filed on May 30, 2014, U.S. patent application Ser. No. 14/318,488 entitled "METHOD, SYSTEM, AND COMPUTER PROGRAM PRODUCT FOR CHECKING OR VERIFYING SHAPES Ind. TRACK PATTERNS FOR ELECTRONIC CIRCUIT DESIGNS" and filed on Jun. 27, 2014, U.S. patent application Ser. No. 14/675,516, entitled "METHODS, SYSTEMS, AND COMPUTER PROGRAM PRODUCT FOR IMPLEMENTING DRC CLEAN MULTI-PATTERNING PROCESS NODES WITH LATERAL FILLS IN ELECTRONIC DESIGNS" and filed concurrently under U.S. patent application Ser. No. 14/675,609, entitled "METHODS, SYSTEMS, AND COMPUTER PROGRAM PRODUCT FOR A BOTTOM-UP ELECTRONIC DESIGN IMPLEMENTATION FLOW AND TRACK PATTERN DEFINITION FOR MULTIPLE-PATTERNING LITHOGRAPHIC TECHNIQUES". The contents of the aforementioned U.S. patent applications are hereby expressly incorporated by reference in their entirety for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Foundries often require electronic design implementations to have no more than a limited number of routing track arrangements, each of which may only take on interconnect segments having width values from a discrete set of legal widths that may be made available in the process Design Rule Manual (DRM) in an effort accommodate complex design rules for advanced process nodes (e.g., 14-nm, 10-nm or below). Furthermore, in order to facilitate multiple-patterning lithographic processes (e.g., SADP or self-aligned double-patterning, SATP or self-aligned triple patterning, LELELE or lithography-etch-lithography-etch-lithography-etch, etc.), foundries may further impose additional constraints on the availability of wire widths that are associated with routing tracks. For example, after a first routing track is chosen and assigned a mask color (e.g. B for Blue) for a particular interconnect segment having a specific width, the next routing track may need to be assigned a different color (e.g., C for Cyan), and may only accept a wire having one of a discrete set of legal width values, where the discrete set of legal width values is in turn a function of the legal width associated with the preceding B routing track.

An electronic design may thus correspond to and include about, for example, a dozen different wire widths, and the routing tracks for routing the electronic design may thus be associated with as many legal widths. Any attempt to manually figure out which routing track associated with a permissible width can directly neighbor another routing track associated with another permissible width is nearly impossible due to the sheer number of different possible legal combinations of routing tracks, especially in light of the extremely complex design rules that govern what track patterns are deemed legal. Therefore, generating a legal track pattern including a plurality of tracks associated with some legal widths is nearly impossible to be performed manually, especially when an electronic design includes more than just a handful of legal or permissible widths. Repetitive track patterns may further exacerbate the complexity in that each track pattern needs to comply with governing design rules and constraints for track patterns, and the repetitive track patterns as a whole also needs to comply with the same set of governing design rules and constraints. Any additions or removal of one or more tracks to a track pattern may propagate throughout the repetitive track patterns, even if a single track pattern may comply with all the pertinent design rules and constraints.

The interplay among complex design rules, the permissible, legal track patterns, and the addition, removal, or modification of an existing design component further complicates the solution finding process to an inextricable extent. A track pattern may be deemed legal if the group of one or more routing tracks in the track pattern complies with various design rules governing which arrangements or sequences of routing track associated with their respective widths are permitted. For example, a design may prohibit arranging a thin wire segment having a width of w1 immediately adjacent to a thick or fat wire segment having a width of w2 in any track pattern. Given this design rule, any track patterns having such an arrangement of two immediately neighboring tracks associated with w1 with w2 violate this design rule and will thus be considered illegal. During the physical design implementation stage, a change may be introduced into an electronic design by, for example, adding, removing, or modifying one or more shapes (e.g., wire segments) in a region of an electronic design. Such a change may be introduced manually by a designer during an interactive editing session or by an electronic design automation (EDA) tool. For example, a designer may insert a second metal shape on a second routing track in a region of an electronic design. The insertion of the second metal shape may leave an unoccupied space between the second metal shape and a preexisting first metal shape implemented along a first routing track.

Assuming the distance between the first metal shape and the second metal shape is the fill distance, the goal is then to find positive definite solutions to a linear Diophantine equation. Depending upon the number of permissible wire widths in an electronic design, the linear Diophantine equation may be solved by using combinatorial optimization techniques such as those used to solve the Knapsack problem in some embodiments. Some other embodiments may utilize a static, predetermined dictionary including permissible legal track patterns that may be looked up for the region at issue. A set of legal track patterns may be identified by considering, for example, the widths of the first shape and the second shape and the fill distance.

Therefore, there exists a need for a method, system, and computer program product for implementing DRC (design rule check) clean multi-patterning process nodes with parallel fills in electronic designs.

SUMMARY

Disclosed are method(s), system(s), and article(s) of manufacture for implementing DRC (design rule check) clean multi-patterning process nodes with parallel fills in electronic designs in various embodiments. Some first embodiments are directed at a method for implementing DRC (design rule check) clean multi-patterning process nodes with parallel fills in electronic designs.

In these first embodiments, the method may include the act of identifying, at a design traversal mechanism including or coupled with at least one micro-processor of a computing system, a first shape and one or more neighboring shapes of the first shape by searching design data of a region of a layout of an electronic design and the act of classifying, at a classification mechanism coupled with the design traversal mechanism, the first shape and the one or more neighboring shapes of the first shape by examining respective characteristics of the first shape and the one or more neighboring shapes of the first shape to categorize the first shape and the one or more neighboring shapes of the first shape into one or more classes of a plurality of classes based in part or in whole upon one or more criteria.

The method may further comprise the act of implementing, at a parallel fill mechanism coupled to the classification mechanism and a DRC mechanism, one or more parallel fill shapes for at least one shape of the first shape and the one or more neighboring shapes by aggregating the one or more parallel fill shapes to the at least one shape based in part or in whole upon the one or more classes while automatically satisfying one or more design rules and the act of performing, at a post-layout operation mechanism, one or more post-layout operations on the layout including the one or more parallel fill shapes by preparing the layout for manufacturing.

In some of these embodiments, the method may further include the act of identifying, at the design traversal mechanism, the one or more neighboring shapes by examining the design data within a range or halo around the first shape in the region. In addition or in the alternative, the method may further include the act of transforming, at a slice mechanism coupled with the design traversal mechanism, the first shape and the one or more neighboring shapes into multiple objects having reduced dimensionality design data in one or more first embodiments.

In some of these one or more first embodiments, the method may further include the act of determining, at the slice mechanism, slices and zero or more existing sliced line segments in the region, the act of identifying, at the slice mechanism, one or more slices to which the first shape belongs by examining the design data of the first data and slice lines corresponding to the one or more slices, and the act of determining, at the slice mechanism, the multiple objects by using the slice mechanism to project ends of the first shape onto the reference line to create projected ends for the first shape along a reference line.

In some of the immediately preceding embodiments, the method may further include the act of decomposing, at the slice mechanism, an existing sliced line segment determined to exist by partitioning the existing sliced line segment into two or more sliced line sub-segments with at least one of the projected ends of the first shape, and the act of updating, at a dictionary mechanism coupled with the slice mechanism, dictionary entries by using data associated with the two or more sliced line sub-segments to update a shape dictionary. In addition or in the alternative, the method may comprise the act of transforming, at a DRC (design rule check) mechanism coupled with the slice mechanism, one or more design rules into one or more transformed design rules by converting the one or more design rules to operate upon the design data having reduced dimensionality than the design data of the first shape or the one or more neighboring shapes.

In some of the immediately preceding embodiments, the method may further identify, with a parallel fill mechanism coupled with the classification mechanism, an optimization target shape by examining the design data of the first shape and the one or more neighboring shape in the region based in part or in whole upon one or more optimization criteria, determine, with the parallel fill mechanism, an object having the reduced dimensionality design data than the design data of first shape or the one or more neighboring shapes by examining the multiple objects to identify the object that corresponds to the optimization target shape, and identify, with a dictionary mechanism coupled with the parallel fill mechanism, one or more first dictionary entries for the object by examining a shape dictionary to locate the one or more first dictionary entries with a correlation or association with the object or the optimization shape.

Optionally, the method may further identify, with the design traversal mechanism coupled with the dictionary mechanism and the classification mechanism, the one or more neighboring shapes within a range or halo of the optimization target and the one or more classes of the one or more neighboring shapes and identify, with the design traversal mechanism coupled with the dictionary mechanism and the classification mechanism, one or more neighboring objects for the one or more neighboring shapes and the reduced dimensionality design data corresponding to the one or more neighboring objects.

Additionally or alternatively, the method may further identify, with the DRC mechanism, the one or more transformed design rules and identify, with the DRC mechanism, a first object from the object and the one or more neighboring objects by applying the one or more transformed design rules to the reduced dimensionality design data of the object and the one or more neighboring objects to select the first object that violates at least one of the one or more transformed design rules.

In some embodiments, the method may determine, at a DRC mechanism coupled to the parallel fill mechanism, whether the one or more parallel fill shapes satisfy one or more additional design rules and present, at the parallel fill mechanism, one or more hints or suggestions in a user interface on a display apparatus using results of determining whether the one or more parallel fill shapes satisfy one or more additional design rules. In addition or in the alternative, the method may further identify, at the parallel fill mechanism coupled with the design traversal mechanism, one or more criteria for a structured layout for the electronic design, identify, at the design traversal mechanism, a plurality of groups of shapes, and identify, at the design traversal mechanism, different values for a common characteristic of each group of the plurality of groups of features, wherein the common characteristic includes a trim mask feature characteristic that is referenced in each group of the plurality of groups of shapes. In some of these immediately preceding embodiments, the method may further modify, at the parallel fill mechanism, at least one group of shapes of the plurality of groups to reduce a total number of the different values for the common characteristic.

Some embodiments are directed at one or more hardware mechanisms that include and/or function in conjunction with at least one micro-processor as well as other related components or architectures of one or more computing systems and may be invoked to perform any of the methods, processes, or sub-processes disclosed herein. The hardware system may include one or more variants of a track pattern processing mechanism, an implementation option processing mechanism, a parallel fill mechanism, a slice mechanism, a design traversal mechanism, a classification mechanism, a track pattern evaluation & generation mechanism, and/or a post-layout operation mechanism in some embodiments.

Each of these mechanisms may include or function in tandem with electrical circuitry and one or more micro-processors each having one or more processor cores to perform its intended functions. The hardware system may further include one or more forms of non-transitory machine-readable storage media or persistent storage devices to temporarily or persistently store various types of data or information, various design rules, various libraries, selected and selectable targets, or any other suitable information or data, etc. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one micro-processor or at least one processor core, causes the at least one micro-processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for implementing three-dimensional operations for electronic designs are described below with reference to FIGS. 1-5.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 4A-1 illustrates a simplified scenario where two wire segments are spaced at a distance that is different from and thus violates the constant spacing rule in some embodiments.

FIG. 4A-2 illustrates a simplified scenario where two wire segments are spaced at a distance that is different from and thus violates the constant spacing rule in some embodiments.

DETAILED DESCRIPTION

Figure 1:
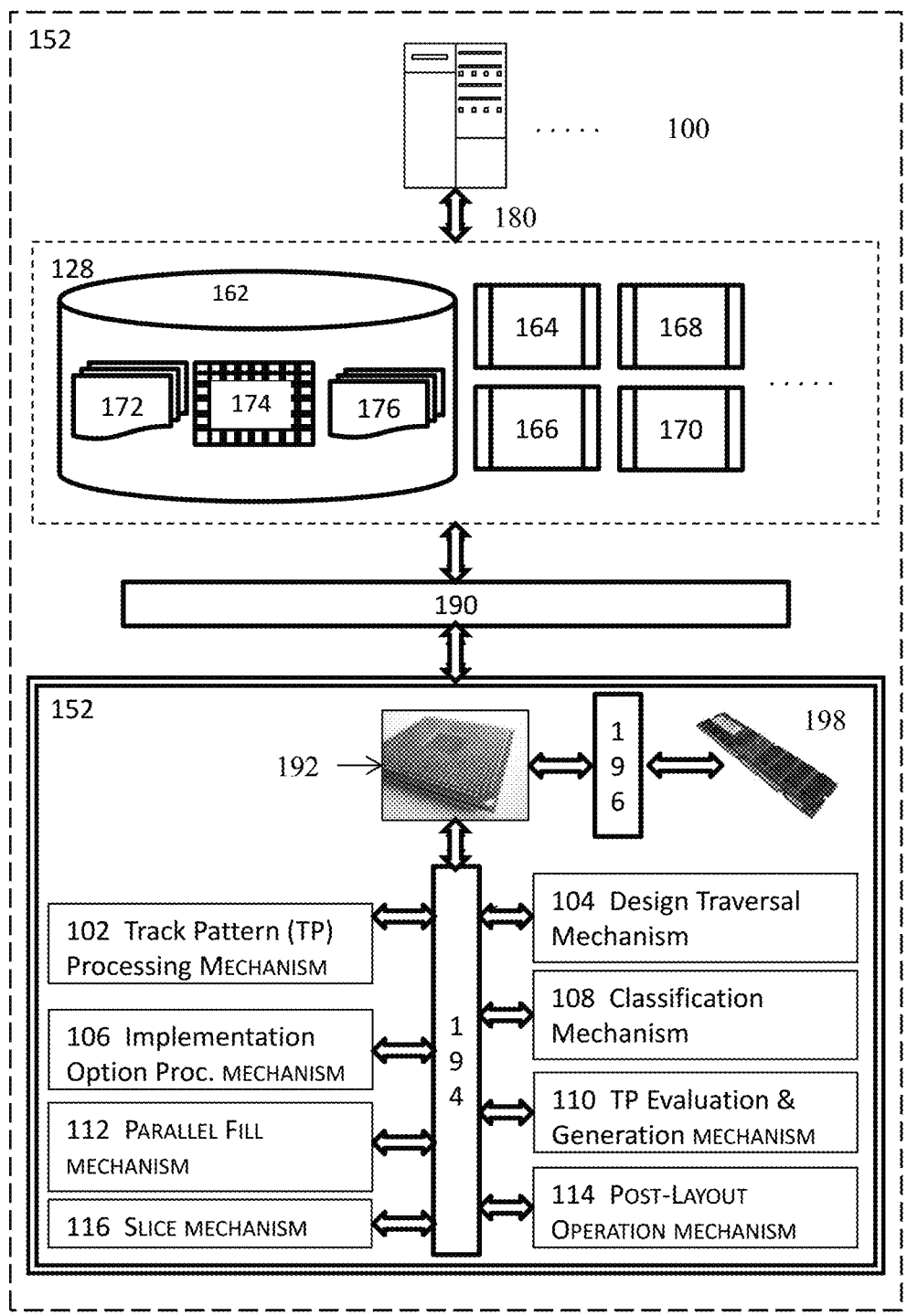
FIG. 1 illustrates a high level block diagram of an electronic design automation system for implementing DRC (design rule check) clean multi-patterning process nodes with parallel fills in electronic designs in one or more embodiments.

Various embodiments are directed to a method, system, and computer program product for implementing electronic design layouts with symbolic representations. Other objects, features, and advantages of the invention are described in the detailed description, figures, and claims.

One or more embodiments are directed at a constraint-based layout implementation methodology that automatically generates or fixes a layout while complying with multiple-patterning design rules or constraints. Given a set of constraints or design rules, the techniques described herein determine multiple slices for a region of a layout by orthogonally projecting the ends of some or all existing shapes in the region onto a reference line. The projection lines passing through end points of shapes may be termed as slice lines. A slice may thus be determined as the subdivided area between two immediately neighboring slice lines. As a result, the slice lines for a region including horizontal shapes include a set of vertical lines, and the slice lines for a region including vertical shapes include a set of horizontal lines.

With the slice lines and slices determined, design rules or constraints that operate upon two-dimensional geometries (e.g., rectangular segments or shapes) may be transformed into one-dimensional geometries. For example, checking whether two adjacent shapes along a routing track meet the spacing design rule may require access to the design database including the design data for these two two-dimensional shapes in conventional approaches. By projecting the end points of shapes along a reference line, the shapes are effectively mapped from the two-dimensional space to the one-dimensional space. In addition, the corresponding design rules or constraints may also be similarly transformed such that in checking whether these transformed design rules or constraints are satisfied, the EDA tool only need to operate upon the design data with reduced dimensionality (e.g., one-dimensional data for the end points).

The existing shapes in the region may also be categorized or classified into a plurality of categories based at in part or in whole upon the modifiability of each of these existing shapes. The plurality of categories may include, for example, fixed geometries, sizable geometries, one-side sizable geometries, and free geometries. More details about each of these categories are described below. The EDA tool may thus determine whether or not the shapes in an electronic design meet the governing design rules or constraints. With the sliced lines and slices, the EDA tool only need to operate on design data having reduced dimensionality in view of the transformed design rules or constraints and thus may identify any violations in a faster and more efficient manner. In the event that modifications to one or more shapes are desired or required (e.g., a violation of a design rule has occurred or an optimization criterion requires or desires modifications to certain shapes), the EDA tool may identify the shapes of interest (e.g., shapes that cause the violation) and their respective categories or classes and perform the fixes upon the shapes that are amenable to modifications to resolve the violation. With the slices and sliced lines, the EDA tool may need to operate upon design data having reduced dimensionality and thus may resolve the violation more efficiently. With the categorization or classification of the existing shapes in the region, one or more criteria may be identified or determined for further processing and hence improving or optimizing the design data in the region. These criteria may be used to determine how at least some of the existing shapes in the region may be further processed. These criteria may include, for example, a criterion to increase or maximize the combined length of two or more shapes, a criterion to reduce or minimize perturbation to design data, etc.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-5.

FIG. 1 illustrates a illustrative high level schematic block diagrams for implementing DRC clean multi-patterning process nodes with parallel fills in electronic designs. In one or more embodiments, FIG. 1 illustrates an illustrative high level schematic block diagrams for implementing DRC clean multi-patterning process nodes with parallel fills in electronic designs and may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc. The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms 152 including hardware mechanisms and software modules or combinations of one or more hardware mechanisms and one or more software modules that may comprises one or more track pattern processing modules 102 to insert, remove, modify, improve, optimize, or otherwise operate upon tracks or routing tracks in track patterns. The set of mechanisms 152 may further include one or more design traversal mechanism 104 to identify an electronic design, a portion thereof, a circuit component design, and one or more circuit component designs interrelated with an identified circuit design component or portion within a context.

The set of mechanisms 152 may further optionally include one or more implementing option processing mechanisms 106 to identify, determine, modify, or rank viable implementing options based on one or more criteria. In addition or in the alternative, the set of mechanisms 152 may further include a classification mechanism 108 to classify or categorize circuit design components into a plurality of classes based in part or in whole upon one or more criteria. In some embodiments, the set of mechanisms 152 may further include one or more track pattern evaluation and generation mechanism 110 to enumerate, determine, or update legal track pattern database(s), to generate viable implementing options for track associated with various widths, to evaluate track patterns against various design rules, performance objectives, manufacturing requirements, and/or other constraints.

The set of mechanisms 152 may further include a parallel fill mechanism 112 to implement parallel fill structures or shapes in an electronic design while satisfying governing design rules. In addition or in the alternative, the set of mechanisms 152 may comprise a post-layout operation mechanism 114 to perform one or more post-layout operations including, for example, post-layout analyses, simulations, design rule check, tapeout, verification, etc.

In some embodiments, the computing system 100 may include the various resources 128 such that these various resources may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more mechanisms in the set of mechanisms 152. One or more mechanisms in the set 152 may include or at least function in tandem with a microprocessor 192 via a computer bus 194 in some embodiments. In these embodiments, a single microprocessor 192 may be included in and thus shared among more than one mechanism even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 2:
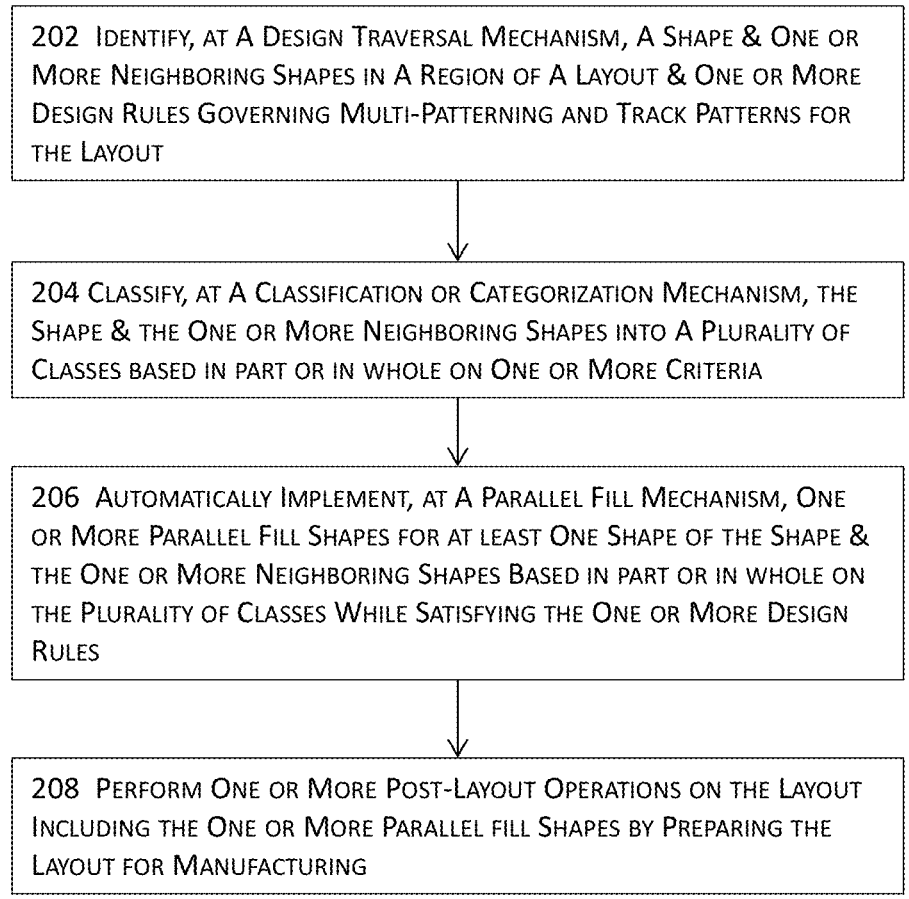
FIG. 2 illustrates a high-level block diagram for implementing DRC clean multi-patterning process nodes with parallel fills in electronic designs in one or more embodiments.

FIG. 2 illustrates a high-level block diagram for implementing DRC (design rule check) clean multi-patterning process nodes with parallel fills in electronic designs in one or more embodiments. In these embodiments, a first shape and one or more neighboring shapes in the vicinity of the first shape may be identified by, for example, a design traversal mechanism that searches the design data (e.g., layout data) and retrieves a shape of interest and its neighboring shapes as well as their respective design data at 202. The vicinity may be identified according to a pre-defined or dynamically determined halo having a certain size or shape in some embodiments. The first shape and these one or more neighboring shapes may be identified by searching the design data in some embodiments. Different types of design data may use different search methodologies. For example, a shape of interest may be identified by traversing, querying (e.g., by performing a region query on a design database), iterating through, or otherwise manipulating the design data to obtain the shape of interest. Search methodologies may also depend upon how the design data are organized. For example, different search methodologies may be used for sorted, ordered, or indexed design data to effectively and/or efficiently obtain shapes of interest at 202.

For example, a designer may manually insert a shape into a portion of a layout, and the design traversal mechanism may function in tandem with the layout editor to identify the manually inserted shape as the first shape and one or more neighboring shapes thereof. In some other embodiments, the vicinity may be identified or determined based on a radius or range of influence which includes at least the portion of the electronic design that is affected by the existence of the first shape. In addition, one or more design rules governing multiple patterning nodes and/or track patterns in an electronic design. In some embodiments, the radius or range of influence may also be determined base in part or in whole upon the one or more identified design rules.

Typical examples for nodes for multi-patterning processes include 14 nm, 10 nm, or smaller advanced nodes for double pattern processes including pitch-split self-aligned double patterning (SADP) such as a negative tone SADP (N-SADP), litho-etch-litho-etch (LELE), etc. These examples for nodes may further include advanced nodes for triple patterning lithography processes comprising, for example, the pitch-split self-aligned triple patterning (SATP) process such as a negative tone SATP (n-SATP), litho-etch-litho-etch-litho-etch (LELELE), litho-etch-litho-etch-end-cutting (LELEEC), etc. The one or more identified design rules may be explicitly specified in, for example, a rule deck comprising a plurality of design rules.

These one or more design rules may also be implied due to one or more particular manufacturing processes that will be used to manufacture integrated circuits according to their respective electronic designs. For example, the use of a negative tone SADP process may imply a single or constant spacing design rule requiring a constant spacing distance between two immediately neighboring interconnects. Another design rule that may be implied by the N-SADP process includes a uni-directional routing design rule requiring that all routes be implemented in the right-way direction (e.g., the preferred routing direction), and that no wrong-way routing (e.g., routing in the non-preferred routing direction) is permitted on one or more layers of an electronic design. Other implied design rules may further include a limited number of permissible arrangements of interconnect widths.

In some embodiments, the one or more design rules governing electronic designs having design elements subject to these multiple patterning processes may include the explicitly specified or implied design rules comprising, for example, a constant spacing design rule, a minimum length design rule, one or more pair design rules (or BC design rules), one or more triplet design rules (or BCB design rules), the same color line end spacing design rule, a different color line end spacing design rule, a same track, same color, different width line end spacing design rule, a different track, different color line end spacing design rule, an end of line keep-out design rule, an opposing end of line keep-out design rule, a minimum end of line spacing design rule, etc.

Design rules governing track patterns may allow only certain arrangements of widths of shapes and thus only certain arrangements of width values that may be associated with a track pattern comprising a plurality of routing tracks. For example, a pair design rule may allow a 32 nm interconnect (and hence a routing track associated with the 32 nm width value) to be immediately adjacent to another interconnect having a width value of 32 nm, 34 nm, 38 nm, 46 nm, and 58 nm and prohibits a routing track associated with the 32 nm width value to be immediately adjacent to another routing track associated with 62 nm, 70 nm, 76 nm, or 86 nm width value. Examples and more details about some design rules and their operations on electronic designs are described below with reference to FIGS. 4A-S.

A routing track or simply a track (hereinafter a "track") includes a one-dimensional fictitious line or line segment derived from the manufacturing grids provided by foundries. A routing track thus having zero width in physical designs (e.g., a layout of an electronic design) and is used to guide physical implementation tools (e.g., floorplanner, placement tools, or routing tools) to implement the physical design for an electronic design. For example, a routing tool may lay the centerline of a wire segment along a routing track during the routing process. A routing track may nonetheless be associated with a width to indicate that the particular routing track is to be used to route wires having the associated width. In this application, some routing tracks may be illustrated as rectangular shapes to indicate that such routing tracks are associated with the widths as shown in various figures. Nonetheless, the rectangular representations of such routing tracks are not intended to explicitly, implicitly, or inherently indicate that routing tracks have two-dimensional geometrical structures or shapes.

A track pattern is a collection of one or more tracks associated with their respective widths of the shapes (e.g., wire segments) that are to be implemented along these one or more tracks. A track pattern is considered legal if the collection of one or more tracks in the track pattern complies with various design rules governing which arrangements or sequences of track associated with their respective widths are permitted. For example, a design may prohibit arranging a thin wire segment having a width of $w_1$ immediately adjacent to a thick or fat wire segment having a width of $w_2$ in any track pattern. Given this design rule, any track patterns having such an arrangement of two immediately neighboring tracks associated with $w_1$ with $w_2$ violate this design rule and will thus be considered illegal.

At 204, the first shape and the one or more neighboring shapes may be classified or categorized into a plurality of classes based in part or in whole upon one or more criteria. These one or more criteria may include the modifiability of shapes in some embodiments. For example, shapes may be classified or categorized into four classes—fixed, sizable, one-side sizable, and free geometry in some embodiments. A shape belonging to the fixed shape class cannot be altered in size, shape, or position and must maintain a fixed size, shape, and location.

A shape belonging to the sizable class may be modified to change its size. In the context of interconnects or traces, a sizable shape or sizable interconnect may grow or shrink in length in either or both directions. A shape belonging to the one-sided sizable class may be modified on one side only, but the opposite side must maintain fixed. In the context of interconnects or traces, a one-sided sizable interconnect or trace may grow or shrink on one end, while the other end of the interconnect or trace remains fixed. A shape belonging to the free geometry class may be modified freely to grow or shrink in size, shape, or location.

A shape belonging to a certain class may be subsequently classified or categorized to another class. For example, an interconnect may be classified or categorized to the sizable class initially. The same interconnect may nevertheless be modified to include a parallel fill shape on one end and may thus be classified or categorized into the one-sided sizable class at the time or after the implementation of the parallel fill shape. In some embodiments, the classification or categorization mechanism monitors one or more shapes and their respective modifications and dynamically classifies or categorizes these one or more monitored shapes accordingly. In some embodiments, the classification or categorization classifies or categorizes not only shapes but also regions, cells, blocks, etc. based in part or in whole upon the contents of the regions, cells, blocks, etc. being classified or categorized.

At 206, one or more parallel fill shapes may be automatically implemented and aggregated into at least one shape of the identified first shape and the one or more neighboring shapes by, for example, the parallel fill mechanism (reference numeral 112 of FIG. 1) based in part or in whole upon the one or more identified design rules and the class to which the at least one shape belongs. A parallel fill shape includes an addition or removal of a fill shape of a certain size and shape to the original shape based in part or in whole on the original geometric characteristics of the original shape.

In the context of interconnects or traces, a parallel fill shape implementation for an interconnect includes extension or contraction of the interconnect along the same routing track on which the centerline of the interconnect lies, regardless of whether or not the interconnect already has one or more parallel fill shapes aggregated into one or both ends in some embodiments. In other words, implementing a parallel fill shape for an original shape may include additions (attachment or aggregation of a positive geometric shape) of one or more extra shapes or removal (attachment or aggregation of a negative geometric shape) of one or more previously added fill shapes or of the existing, original shape in these embodiments. For example, if an interconnect already has an additional parallel fill shape aggregated into one end, further implementations of parallel fill shapes for this interconnect may include removing at least a part of the additional parallel fill shape on the one end, removing a part of the original interconnect on the other end, or both.

In some embodiments, the parallel fill mechanism may present one or more hints or suggestions for implementing the one or more parallel fill shapes (via addition or subtraction) on a display apparatus and may further present the impact of the presented one or more hints or suggestions prior to actually implement the parallel fill shapes. For example, the parallel fill mechanism may present the one or more hints or suggestions as one or more DRC markers. The parallel fill mechanism may further present the impact of these one or more DRC markers in a textual form, graphical form, or both. For example, the parallel fill mechanism may function in tandem with the DRC engine or mechanism to indicate the type, extent, or severity of violations for one or more of these DRC markers.

A working example may include the scenario where a designer interactively inserted a shape in a layout. Given the interactively added shape, the design traversal mechanism may identify the interactively added shape as the first shape and one or more neighboring shapes within a range or halo of the first shape; and the classification or categorization mechanism may classify or categorize the first shape and the one or more neighboring shapes into a plurality of classes based on their modifiability. At least one shape of the first shape and the one or more neighboring shape may be identified for parallel fill implementation which may alter the size and/or shape of the at least one shape based on one or more design rule of interest. In some embodiments, one or more hints or suggestions for the parallel fill implementation may be provided to the user in a textual form, a graphical form, or both so that the designer may visualize and understand the type, extent, and/or severity of violations as well as how the parallel fill mechanism may resolve the issues arising out of the introduction of the shape by the designer.

In some embodiments, the at least one shape may be determined based in part or in whole upon the modifiability or the respective classes of the first shape and its one or more neighboring shapes. For example, a fixed shape whose size, shape, and location cannot be modified may be excluded from the implementation of parallel fill shapes. In some embodiments, the parallel fill mechanism may function in tandem with the classification or categorization mechanism to prioritize the classes. For example, the parallel fill mechanism may assign priorities to the aforementioned classes as, from highest to lowest, the free geometry, the sizable class, the one-sided sizable class, and the fixed class.

In some embodiments, the at least one shape may be determined based in part upon one or more optimization criteria for the electronic design. These one or more optimization criteria may include, for example, reducing or minimizing perturbation (e.g., the amount or extent of the modification to the electronic design) to the electronic design by increasing or maximizing combined space between opposing ends of shapes, increasing or maximizing combined length(s) that attempts to maintain minimum spacing between two opposing shape ends when possible, enhancing or maximizing uniformity of trim mask features that attempts to reduce or minimize the number different trim mask features for multiple patterning, etc.

As the parallel fill mechanism implements the parallel fill shapes while accounting for the one or more identified design rules, the outcome generated by the parallel fill mechanism automatically satisfies these one or more identified design rules and thus does not have to go through design rule checks for these one or more identified design rules. In other words, the parallel filled layout is correct by construction at least as far as these one or more identified design rules are concerned.

At 208, one or more post-parallel fill operations may be performed by, for example, the post-layout operation mechanism (e.g., reference numeral 114 of FIG. 1) with the automatically inserted one or more parallel fill shapes. These one or more post-parallel fill operations may include, for example, design rule checks, verification tasks, various analyses, various layout simulations, tapeout, etc.

Figure 3A:
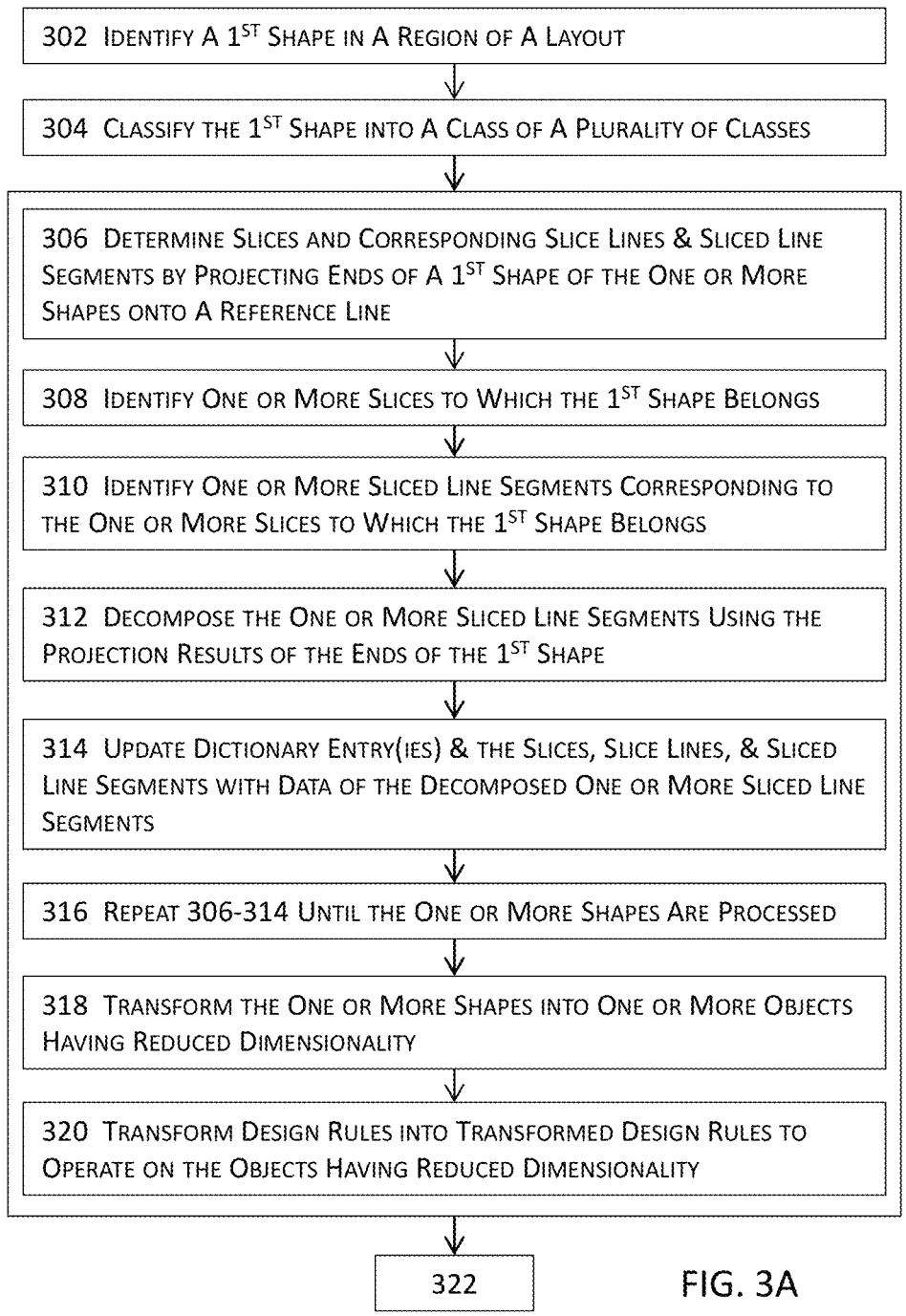
FIGS. 3A-C jointly illustrate a more detailed block diagram for implementing DRC clean multi-patterning process nodes with parallel fills in electronic designs in one or more embodiments.
Figure 3B:
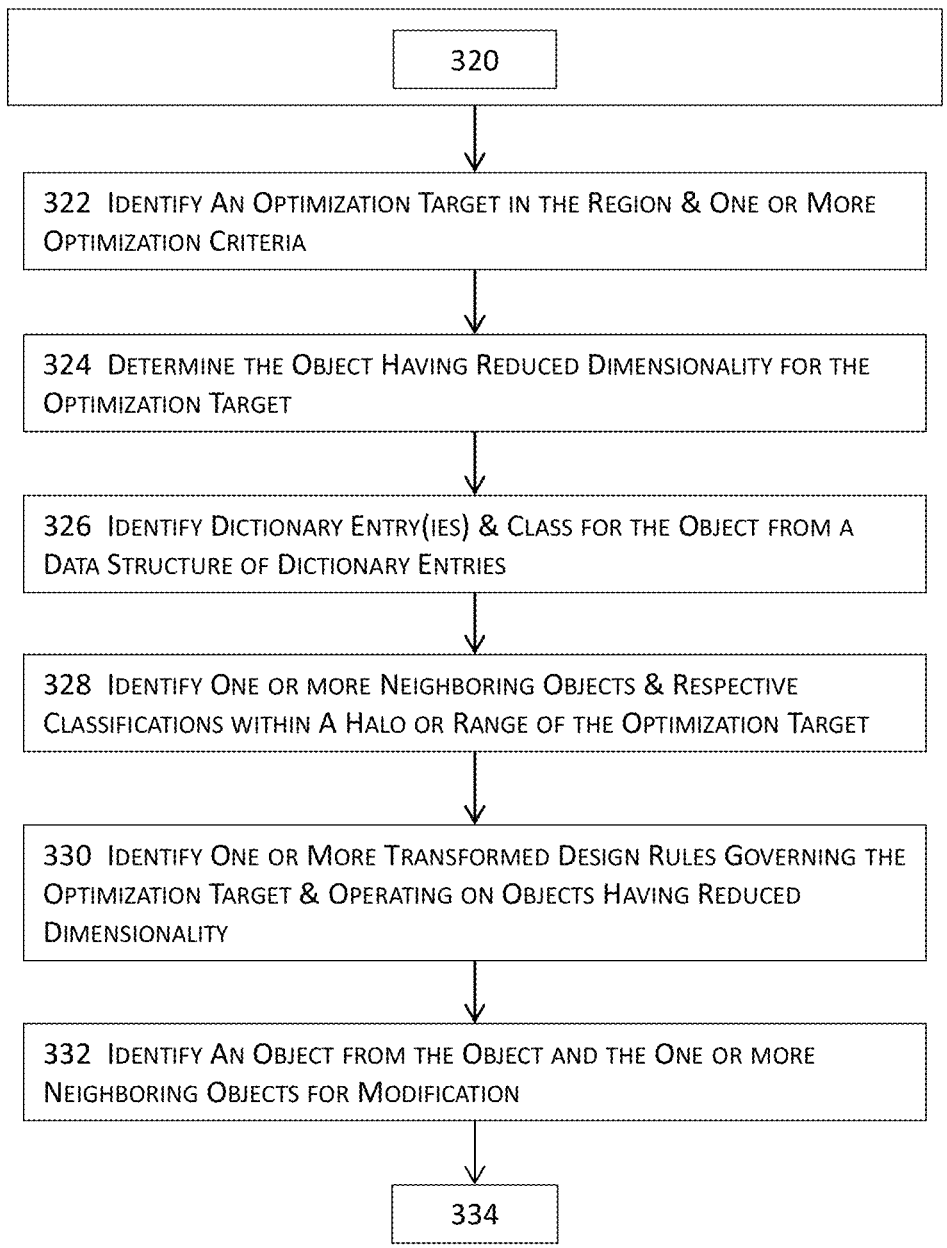
Figure 3C:
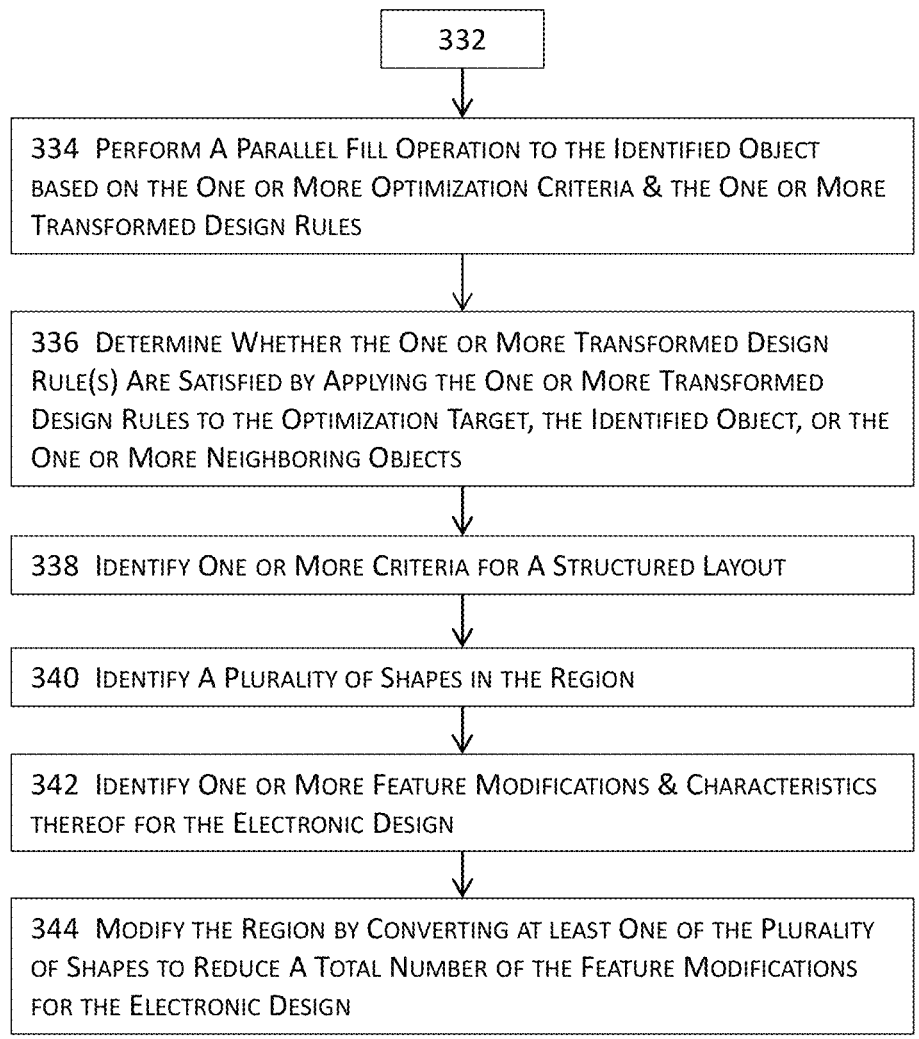

FIGS. 3A-C jointly illustrate a more detailed block diagram for implementing DRC (design rule check) clean multi-patterning process nodes with parallel fills in electronic designs in one or more embodiments. A first shape in a region may be first identified at 302 by, for example, a design traversal mechanism (e.g., reference numeral 104 of FIG. 1). In some embodiments, one or more neighboring shapes of the first shape may also be identified at 302. At 304, the first shape may be classified or categorized by, for example, a classification or categorization mechanism into a class of a plurality of classes. In some embodiments where one or more neighboring shapes are also identified for the first shape, these one or more neighboring shapes are also classified or categorized into one or more classes of the plurality of classes at 304.

At 306, slices, slice lines, and sliced line segments may be determined by invoking a slice mechanism (e.g., reference numeral 116 of FIG. 1) that projects the ends of the one or more identified first shape and the one or more neighboring shapes, if identified, onto a reference line. In the context of interconnects of integrated circuit (IC) designs or traces of IC packaging design or PCB (printed circuit board) designs, the ends of the interconnects or traces may be projected onto a reference line that is parallel to a routing direction of these interconnects or traces. For example, the first end and the second end of a horizontal interconnect segment may be projected as the first projected end and the second projected end on a horizontal reference line.

The vertical line segment connecting the first end and the first projected end and spanning across the entire height of the design space constitutes a slice line. Similarly, the vertical line segment connecting the second end and the second projected end and spanning across the entire height of the design space constitutes the other slice line determined by the interconnect. The line segment connecting the first projected end and the second projected end on the reference line constitutes a sliced line segment. Each of the slice line and the other slice line may further subdivide an existing an existing slice although the slices and slice lines may be optionally determined while the end coordinates of the sliced line segments may be subsequently used for various other purposes (e.g., for DRC).

A slice corresponds to a region (e.g., a cell, a block, or an area) that spans along a routing direction and may extend across the entire length in the other routing direction. In the context including a sliced line (see below), a slice may include multiple segments (e.g., sliced line segments) along the sliced line. In this context, a segment or a slice along a sliced line may comprises an object that may be used to traverse a container including, for example, lists, maps, a sliced line, etc. In these embodiments, a sliced line comprises a collection of ordered objects (e.g., the aforementioned "segments" or "slices").

A segment may be formed along a sliced line when projecting the end points of a wire segment onto the sliced line. Such a segment between a start point and an end point, projected from a corresponding wire segment, along the sliced line may be called a sliced line segment. A sliced line segment may be obtained by projecting the line ends of a wire segment onto the slice line and thus may be associated with the absolute or relative coordinates of the start point indicating the beginning of the sliced line segment and the end point indicating the end point of the sliced line segment.

A sliced line segment may be further divided into multiple, shorter sliced line segments. Multiple sliced line segments may also be merged into a longer, single sliced segment. The region situated between two segments and perpendicular to the routing direction may be called a slice where these two vertical line segments may extend all the way to the upper period line of the region. More details about slices, slice lines, and sliced line segments as well as their respective manipulations and operations are described in some of the related U.S. patent applications (e.g., U.S. patent application Ser. No. 14/318,488) listed in the Cross Reference to Related Applications section.

At 308, one or more slices to which the first shape belongs may be identified. For example, a horizontal interconnect may span across multiple vertical slices defined by one or more existing geometric shapes. In this example, these multiple vertical slices to which the interconnect belongs may be identified at 308. In some embodiments, the first shape may be entirely situated within an existing slice which will be identified at 308. In some other embodiments, the first shape may span across multiple slices which will also be identified at 308.

At 310, one or more sliced line segments may be determined for the first shape and the one or more neighboring shapes, if identified at 302, by the slice mechanism that projects the respective ends of the first shape and the one or more neighboring shapes onto the same reference line to create a plurality of projected ends on the reference line. The design data represented by the sliced line segments may be stored as dictionary entries having reduced dimensionality in a shape or pattern dictionary. A shape or pattern dictionary may include numerous entries for various shapes in one or more electronic designs. For example, a shape or pattern dictionary may include entries for various shapes of an electronic design that is being checked or verified or for various other shapes of one or more prior electronic designs, some of which may be structurally or functionally similar to the electronic design that is being checked or verified.

The generation of a sliced line segment on a reference line from a shape effectively converts and reduces the original dimensionality of the design data of the two-dimensional shape to one-dimensional design data represented by the sliced line segment, while the one-dimensional design data may still be used in, for example, design rule checks or verification tasks for at least the region without referring to the design data of the two-dimensional shapes to determine whether the one-dimensional data comply with various design rules governing the shape in one dimension or in both dimensions. In some of these embodiments, a sliced line represents a one-dimensional representation of various shapes in a two-dimensional design.

To determine the two-dimensional spatial relationship between two two-dimensional shapes in the two-dimensional design, these techniques described herein may leverage the dictionary entries associated with the sliced line segments of these two shapes as well as the sliced line segments or slices to capture the two-dimensional spatial relationship between these two shapes with the one-dimensional sliced line. For example, an associated dictionary entry provides a distances or offsets of both edges the corresponding shape to a reference basis, a distance to an edge and a width of the corresponding shape, or any other geometric information that is appropriate to locate the shape along an axis that is not captured by the sliced line. Therefore, by using the slices or sliced segments together with the associated dictionary entries, these techniques described herein may be made aware of the relative or absolute position in the direction orthogonal to the direction of the sliced line, without having to manipulate the more complex two-dimensional shapes or geometric data of the shapes.

In these embodiments, the design rule check and verification may be performed in a much more efficient manner within a much shorter runtime because the method needs only to process reduced dimensionality data (e.g., the sliced line segments) for design rule check and verification. In these embodiments, although the sliced line and its sliced line segments include reduced dimensionality design data, various design rule checks and/or verification tasks may be performed by using the design data represented by the reduced dimensionality sliced line and sliced line segments. For example, any end-of-line rule (e.g., end of line spacing rules between two opposing ends) may be quickly checked by using the sliced line or the sliced line segments. As another example, the techniques described herein may simply compare or perform simple arithmetic operations on the end points of two sliced line segments projected from two corresponding overlapping shapes to determine whether or not the overlap satisfies a keep-out rule which requires a permissible range of overlap for two overlapping, immediately neighboring wire segments.

At 312, a sliced line segment of the one or more sliced line segments may be further decomposed with, for example, the slice mechanism that references the projected end points of the first shape and those of the one or more neighboring shapes to partition the sliced line segment into multiple sub-segments. For example, if a sliced line segment has two end points A and B, and the ends of the first shape are projected as two additional points C and D onto the sliced line segment such that these four points are arranged along the reference in the order of A-B-C-D. In this example, the slice mechanism may partition the sliced line segment A-B into three sub-segments, A-B, B-C, and C-D.

The dictionary entries corresponding to the sliced line segments, sub-segments, etc. in the dictionary may be updated at 314 in some embodiments. In these embodiments, a dictionary mechanism may function in tandem with the slice mechanism to update the shape or pattern dictionary with data of the one or more decomposed sliced line segments determined at 312. Some or all of the series of acts 306 through 314 may be repeated at 316 until one or more shapes of interest have been similarly or identically processed as described above. At 318, the one or more shapes of interest may be transformed into one or more objects having reduced dimensionality and corresponding to the one or more shapes of interest. In some embodiments, the one or more two-dimensional shapes may be transformed into one or more corresponding one-dimensional sliced line segments. In some of these embodiments, the one or more objects having reduced dimensionality may be further associated with, for example, the spatial relationship between the one or more shapes and the reference line.

At 320, one or more design rules operating on two-dimensional design data may also be transformed into one or more transformed design rules operating on reduced dimensionality design data. For example, a design rule operating on the four vertices of a two-dimensional rectangular shape may be transformed into a transformed design rule operating on one-dimensional end coordinates obtained from projecting the two-dimensional shape onto a reference line. An optimization target in the region may be identified at 322 in some embodiments. In addition, one or more optimization criteria may also be identified at 322.

An optimization target may include a shape, the modification of which may improve or optimize the electronic design or at least a portion thereof by, for example, a fewer number of DRC violations, better manufacturability, a fewer number of trim mask features, more structured design, etc. In some embodiments, an optimization target may include a shape that is interactively introduced to the electronic design or identified by the user. These one or more optimization criteria may include, for example, reducing or minimizing perturbation (e.g., the amount or extent of the modification to the electronic design) to the electronic design by increasing or maximizing combined space between opposing ends of shapes, increasing or maximizing combined length(s) that attempts to maintain minimum spacing between two opposing shape ends when possible, enhancing or maximizing uniformity of trim mask features that attempts to reduce or minimize the number different trim mask features for multiple patterning, etc.

in some embodiments. The corresponding object having reduced dimensionality may be determined from the one or more objects at 324 for the optimization target that has been identified at 322. For example, a slice mechanism may reference the shape dictionary to identify the corresponding object for the optimization target in some embodiments where the dictionary entries for the optimization target have been created. In some other embodiments where the dictionary entries for the optimization target are not yet available, the slice mechanism may function in conjunction with the dictionary mechanism to generate the corresponding object (e.g., a sliced line segment) and the design data thereof.

One or more dictionary entries and the class may be identified at 326 for the corresponding object via, for example, the dictionary mechanism. The one or more dictionary entries for the corresponding object may be identified by, for example, using a dictionary mechanism coupled with the slice mechanism to examine the shape dictionary to locate these one or more dictionary entries with a correlation or association with the corresponding object or the shape from which the corresponding object is transformed. For example, the dictionary mechanism may reference the identification of the corresponding object or the shape from which the corresponding object is transformed to locate the one or more dictionary entries in the shape dictionary in some embodiments.

One or more neighboring shapes with a halo, range, or radius of influence of the optimization target and their respective classes may also be identified at 328 with, for example, the design traversal mechanism. To ensure correct by construction, one or more transformed design rules that govern the optimization target and operate on objects having reduced dimensionality may be identified at 330 via, for example, a design rule mechanism. These techniques described herein may then determine an object for modification from the object transformed from the optimization target and its one or more neighboring shapes at 332. In some embodiments, the object for modification may be determined based in part or in whole upon the respective modifiability of these shapes under consideration, the impact of modification of a shape on another portion of the electronic design, a cost function evaluating modifications of these shapes under consideration, or one or more optimization criteria such as those described above with reference to FIG. 2.

At 334, a parallel fill operation may be performed with the parallel fill mechanism to the identified object based in part or in whole upon the one or more transformed design rules and/or one or more criteria such as those optimization criteria described immediately above with reference to 332. In some embodiments where the ends of an identified shape are projected onto a reference line as projected end points, a parallel fill operation may modify the reduced dimensionality design data of the identified object by altering the dictionary entries and hence the locations of the projected end points in light of the one or more transformed design rules.

In addition or in the alternative, the parallel fill mechanism may function in tandem with both the slice mechanism and the dictionary mechanism may provide hints or suggestions such as DRC markers for the potential violations before or after the proposed or actual fixes by the parallel fill mechanism. In some embodiments, parallel fill operations are performed in nearly real time (e.g., with the possible lag due to signal transmission and the clock cycles for computations) in response to a designer's interactive editing of the layout by adding or removing one or more shapes or by modifying existing one or more shapes such that the layout is correct by construction at least as far as the one or more identified design rules are concerned.

At 336, it may further be optionally determined whether the one or more transformed design rules are satisfied by performing the one or more transformed design rules to the optimization target, the identified object, or the one or more neighboring objects. The determination may be optionally because some design configurations may not necessarily be able to satisfy all the governing design rules and thus need to be redesigned, and further because the parallel fill operation performed or the hints or suggestions provided at 334 may flag a certain portion of the design if the DRC engine or mechanism in conjunction with the parallel fill mechanism determines that no parallel fill operations may be implemented to the layout to ensure that the layout satisfies the one or more identified design rules. An example of such design configurations is illustrated in FIGS. 4K and 4Q and described below.

In these embodiments, the one or more layout shapes causing such violations without fixing options may be flagged for subsequent, more drastic fixing operations or repairs (e.g., rip-up-and-reroute, redesign, ECOs or engineering change orders, etc.) In some embodiments where multiple parallel fill operations may be applied to the same object or objects whereas a particular parallel fill operation is identified and performed at 334, the parallel fill mechanism may function in tandem with the DRC engine and/or one or more other mechanisms (e.g., the design traversal mechanism) to determine whether the unselected parallel fill operations may produce a DRC clean layout for the object identified at 332. If it is determined that only one parallel fill operation produces DRC clean results, the parallel fill mechanism may directly perform this only parallel fill operation or present it as a hint or suggestion to the designer.

In some other embodiments where multiple parallel fill operations may produce DRC clean results, the parallel fill mechanism may either report or perform the first parallel fill operation producing DRC clean results or present these multiple parallel fill operations to the designer as viable candidates for parallel fills. In some of these embodiments, the parallel fill mechanism may order these multiple parallel fill operations based in part or in whole upon, for example, one or more criteria (e.g., the one or more optimization criteria as described above) and present these multiple parallel fill operations to the designer in their respective orders or priorities.

At 338, one or more criteria for a more structured layout may be optionally identified. A more structured layout includes more features of the same size and/or shape. In some embodiments where the layout is to manufacture an electronic design with multiple patterning lithographic techniques, a more structured layout may include, for example, more features that may be manufactured by trim mask features having the same width value or the same shape (e.g., both the same width and the same length). In some other embodiments, a more structured layout may include more shapes whose ends are aligned or more shapes corresponding to a fewer number of opposing end spacing values.

More structured layouts may result in better fidelity in the printed layout in that the as printed features better conform to the corresponding features as designed with less deviations. At 340, a plurality of shapes spanning across multiple routing tracks may be identified in the identified region. In order to achieve the one or more criteria for a more structured layout, one or more feature modifications and one or more corresponding characteristics thereof may be identified at 342. In an example where a trim mask is used to fabricate the electronic design, the design traversal mechanism may identify multiple trim mask features as a feature modification for manufacturing the plurality of shapes identified at 340. In this example, the design traversal mechanism may further identify the widths of these multiple trim mask features as one of the one or more corresponding characteristics at 342.

In some of these embodiments, the design traversal mechanism may also identify the lengths of these multiple trim mask features as another one of the one or more corresponding characteristics at 342. At 344, the region may be further optionally modified by converting at least one shape of the plurality of shapes identified at 340 such that the total number of feature modifications for the electronic design may be reduced. For example, the first feature modification required or desired for manufacturing the at least one shape may be devised or modified to have the same characteristic as that of a second feature modification required or desired for manufacturing another set of shapes in the electronic design. In this example, the total number of different feature modifications is reduced by one due to the modification of the characteristic of the first feature modification. In the aforementioned example including a trim mask, the first feature modification may include a first trim mask feature, and the second feature modification may include a second trim mask feature. In this example, the region may be optionally modified such that the characteristic (e.g., the width and/or the shape) of the first trim mask feature is identical to each other. In some embodiments, the parallel fill mechanism may adjust one or more parallel fill shapes and/or one or more original shapes (by extension or contraction) prior to any parallel fill operations to adjust one or more opposing line end spacing values such that these original shapes may be manufactured with a fewer or minimum number of different trim mask features having different widths or shapes.

Figure 4A:
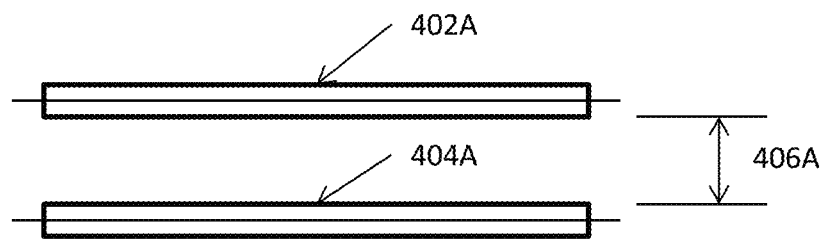
FIG. 4A illustrates a constant spacing design rule that requires two wire segments be spaced apart from each other at a constant spacing between corresponding edges of the wire segments.
Figures 1, 4A:
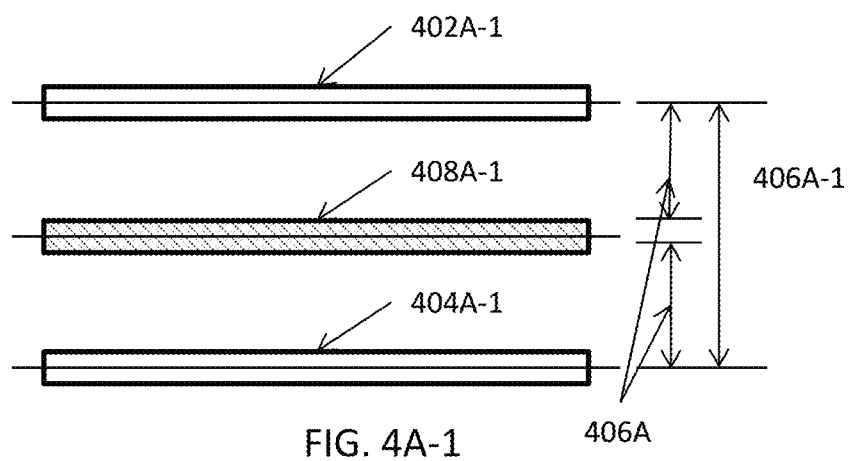
Figures 2, 4A:
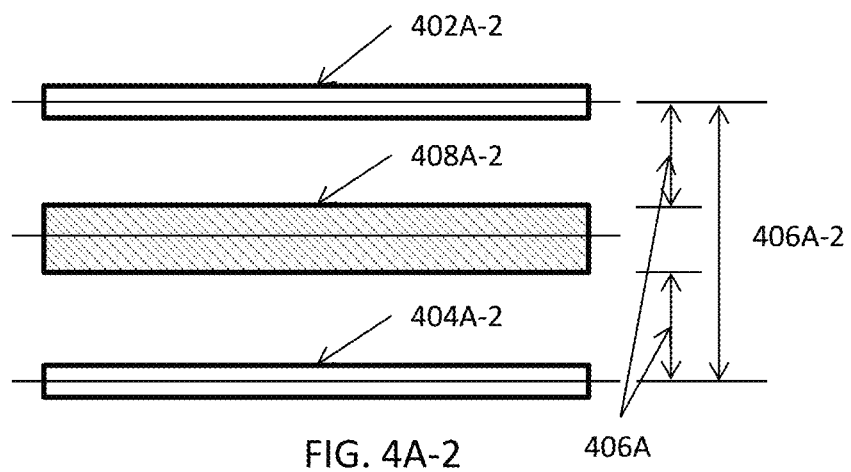

FIGS. 4A-I illustrates some illustrative design rules governing track patterns in electronic circuit designs in some embodiments. More specifically, FIG. 4A illustrates a constant spacing design rule that requires two wire segments 402A and 404A be spaced apart from each other at a constant spacing between corresponding edges of the wire segments as shown by the distance 406A in FIG. 4A. FIG. 4A-1 illustrates a scenario where two wire segments 402A-1 and 404A-1 are spaced at a distance 406A-1 that is different from and thus violates the constant spacing rule in some embodiments.

Various methods or systems may use techniques described herein to identify and insert another track 408A-1 between the first track for the first wire segment 402A-1 and the second track for the second wire segment 404A-1 to satisfy the constant spacing design rule. FIG. 4A-2 illustrates a scenario where two wire segments 402A-2 and 404A-2 are spaced at a distance 406A-2 that is different from and thus violates the constant spacing rule in some embodiments. Various methods or systems may use techniques described herein to identify and insert another track 408A-2 between the first track 402A-2 and the second track 404A-2 to satisfy the constant spacing design rule.

Figure 4B:
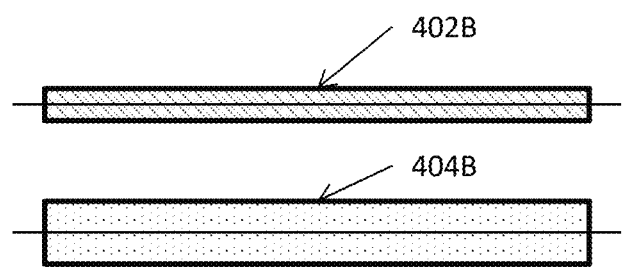
FIGS. 4B-I illustrate some illustrative design rules governing track patterns in electronic circuit designs in some embodiments.

FIG. 4B illustrates a pair design rule which requires two adjacent wire segments 402B and 404B spaced at a certain distance be placed on two separate photo masks for manufacturing. Each wire segment is then associated with its respective photomask designation. This design rule may further govern what width combinations are legal. In other words, given a set of width values that may be used to implement wires in an electronic design, only a smaller subset of width combinations out of the set of all possible width combinations are considered legal.

Figure 4C:
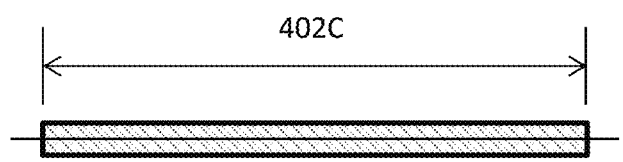
Figure 4D:
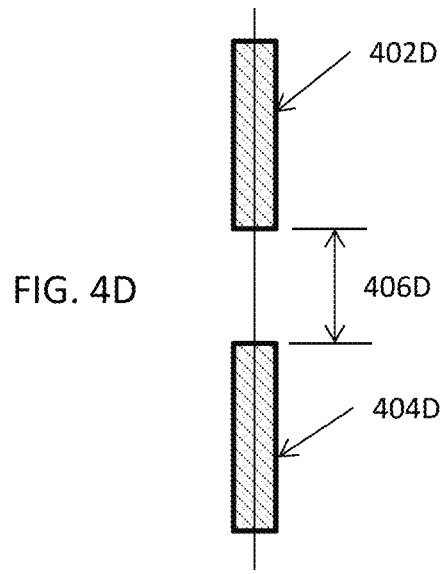

FIG. 4C illustrates a minimum length design rule that requires each wire segment in an electronic design to have at least the minimum required length 402C in order to comply with this minimum length design rule. FIG. 4D illustrates the same track, same color line end spacing design rule which requires that the two facing line ends of two wire segments 402D and 404D along the same routing track and with the same photomask designation be spaced at a distance that is greater than or equal to a minimum line-end spacing value 406D.

Figure 4E:
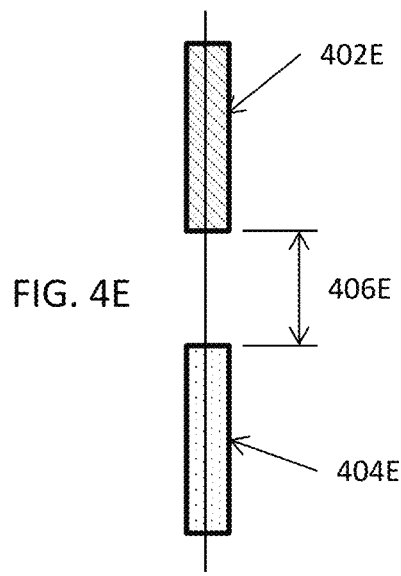
Figure 4F:
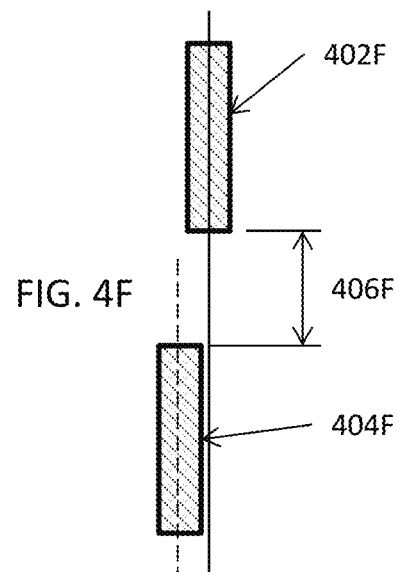

FIG. 4E illustrates the same track, different color line end spacing design rule which requires that the two facing line ends of two wire segments 402E and 404E along the same routing track but with different photomask designations be spaced at a distance that is greater than or equal to a minimum line-end spacing value 406E. FIG. 4F illustrates the different track, same color line end spacing design rule which requires that the two facing line ends of two wire segments 402F along the first track and 404F along the second routing track with same photomask designation be spaced at a distance that is greater than or equal to a minimum line-end spacing value 406F.

Figure 4G:
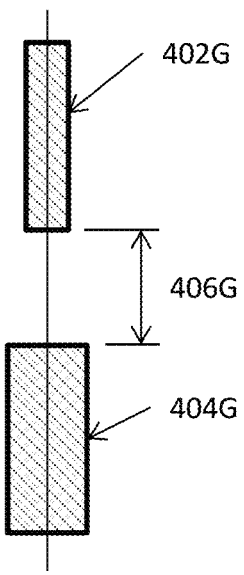
Figure 4H:
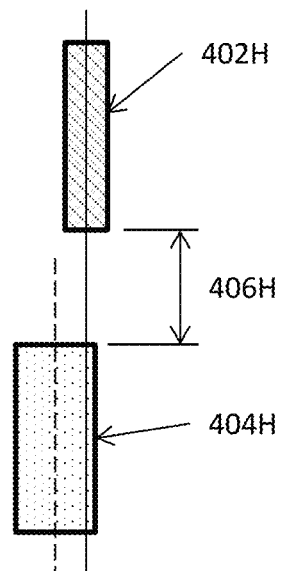

FIG. 4G illustrates the same track, same color, different width line end spacing design rule which requires that the two facing line ends of two wire segments 402G having a first width and 404G having a second width along the same routing track and with the same photomask designation be spaced at a distance that is greater than or equal to a minimum line-end spacing value 406G. FIG. 4H illustrates the different track, different color line end spacing design rule which requires that the two facing line ends of two wire segments 402H along the first track and 404H along the second routing track but with different photomask designation be spaced at a distance that is greater than or equal to a minimum line-end spacing value 406H.

Figure 4I:
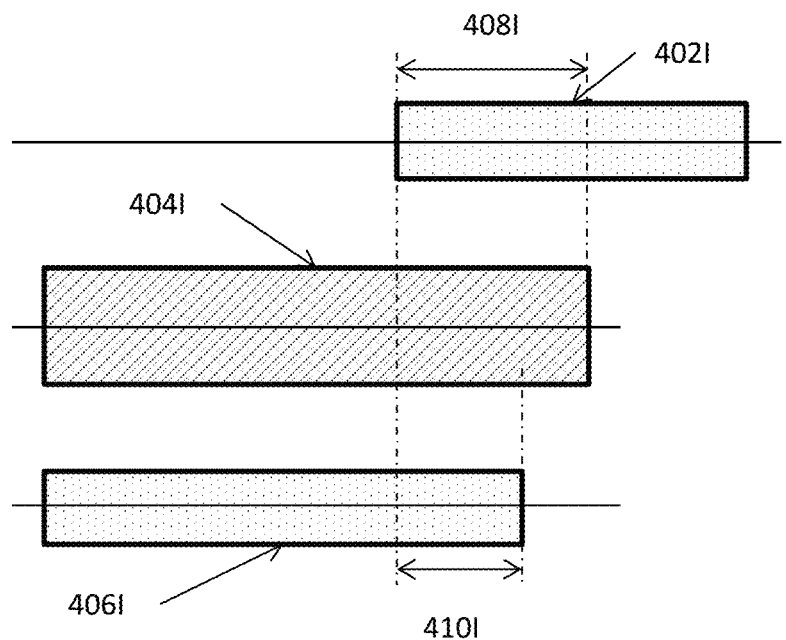

FIG. 4I illustrates a keep-out design rule. In FIG. 4I, the first wire segment 402I and the third wire segment 406I have the same photomask designation, and the second wire segment 404I has a different photomask designation. Each wire segment is associated with its respective width, and the three-track combination with three respective widths satisfies the triplet design rule. The keep-out rule requires that the overlapping line end of the first wire segment 402I is at a distance that is greater than or equal to the keep-out distance 408I from the overlapping line end of the second wire segment 404I. The keep-out rule also requires that the line end of the other adjacent wire segment 406I of the second wire segment 404I is at a distance that is greater than or equal to the "next neighbor keep-out" distance 410I from the overlapping line end of the second wire segment 404I. The "next neighbor keep-out" distance 410I may be dependent on the width of the second wire segment 404I in some embodiments.

Figure 4J:
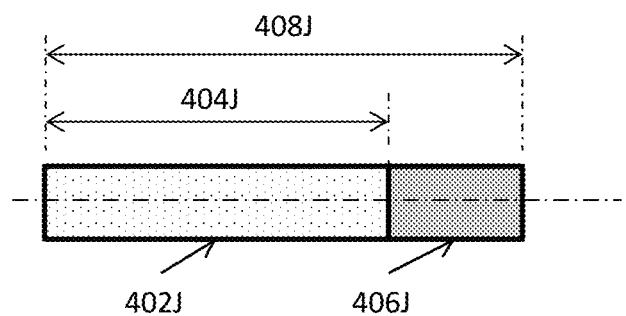
FIG. 4J illustrates the automatic application of some techniques described herein to a shape to satisfy a minimum length design rule in some embodiments.
Figure 4K:
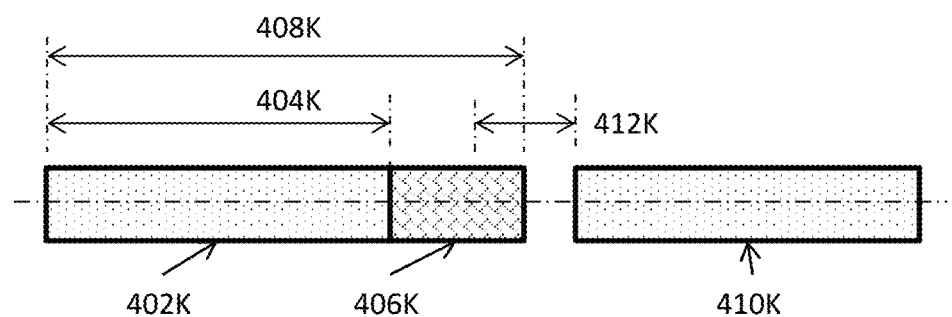
FIG. 4K illustrates the automatic application of some techniques described herein to implement a parallel fill to a shape to satisfy a minimum length design rule and the operation of a minimum end of line spacing design rule in some embodiments.

FIG. 4J illustrates the automatic application of some techniques described herein to a shape to satisfy a minimum length design rule in some embodiments. More specifically, FIG. 4J illustrates an original shape 402J having an original length 404J that does not satisfy the minimum length design rule requiring a shape to have at least a predetermined length. In the context of interconnects or traces, interconnects or traces having different widths may correspond to the same minimum length design rule or different minimum length design rules. The parallel fill mechanism described herein may automatically extend the length 404J of the shape 402J to the length 408J by adding a parallel fill shape 406J so that shape 402J satisfies at least the minimum length design rule. For example, a designer may interactively add a new shape or modify an existing shape to produce shape 402J, various mechanisms described herein may dynamically capture this interactively introduced shape 402J and adjust its size and/or shape to meet various governing design rules—the minimum design rule in this example illustrated in FIG. 4J.

FIG. 4K illustrates the automatic application of some techniques described herein to implement a parallel fill to a shape to satisfy a minimum length design rule and the operation of a minimum end of line spacing design rule in some embodiments. More specifically, FIG. 4K illustrates a portion of a simplified electronic design including the first shape 402K having its original length 404K that fails to satisfy the minimum length design rule. The portion of the simplified electronic design also includes the second shape 410K along the same routing track on which the first shape 402K lies.

The parallel fill mechanism may add a parallel fill shape 406K to the first shape 402K so that the total length 408K of shape 402K now satisfies the minimum fill mechanism. Nonetheless, the DRC mechanism, which functions in tandem with the parallel fill mechanism, may determine that adding the parallel fill shape 406K violates the opposing line end spacing design rule which requires a minimum spacing between opposing line ends as indicated by 412K. As a result of this potential violation, the parallel fill mechanism may graphically present the parallel fill shape 406K with different textual emphasis, graphical emphasis, or both without actually implementing the parallel fill shape 406K.

Figure 4L:
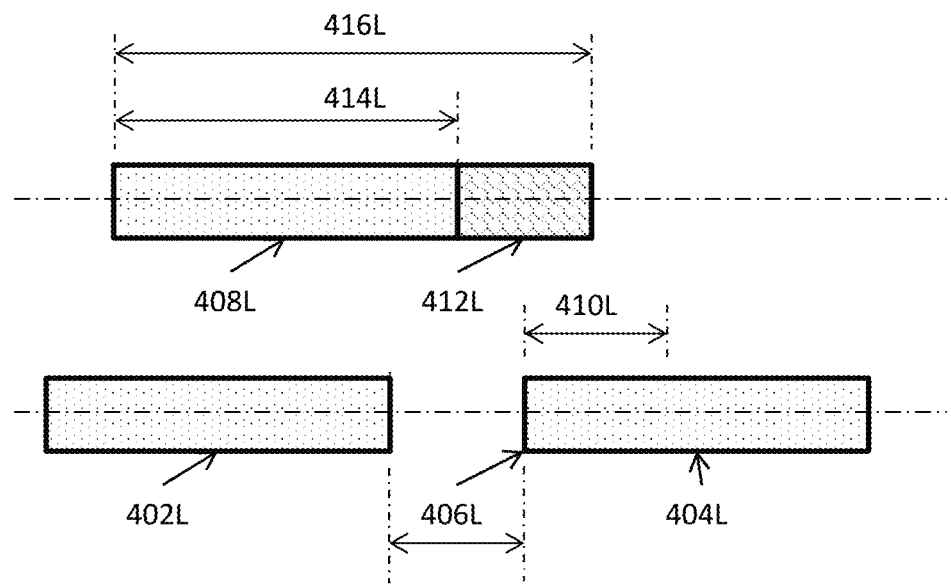
FIG. 4L illustrates the interaction between the minimum length design rule, the minimum end of line spacing design rule, and the opposing end of line keep-out design rule in a portion of a simplified layout in some embodiments.

FIG. 4L illustrates the interaction between the minimum length design rule, the minimum end of line spacing design rule, and the opposing end of line keep-out design rule in a portion of a simplified layout in some embodiments. More specifically, FIG. 4L illustrates a portion of a simplified layout including the first shape 402L spaced apart by a spacing value 406L from the second shape 404L. The opposing end of line keep-out design rule requires two opposing ends of two shapes on two separate routing tracks to be at a minimum spacing value indicated by 410L. The portion of the simplified layout further includes the third shape 408L having its original length 414L that fails to satisfy the minimum length design rule.

The parallel fill mechanism may add a parallel fill shape 412L to the third shape 408L so that the total length 416L of shape 408L now satisfies the minimum fill mechanism. Nonetheless, the DRC mechanism, which functions in tandem with the parallel fill mechanism, may determine that adding the parallel fill shape 412L violates the opposing end of line keep-out design rule which requires a minimum spacing between opposing line ends on two adjacent routing tracks as indicated by 410L. As a result of this potential violation, the parallel fill mechanism may graphically present the parallel fill shape 412L with different textual emphasis, graphical emphasis, or both without actually implementing the parallel fill shape 412L.

Figure 4M:
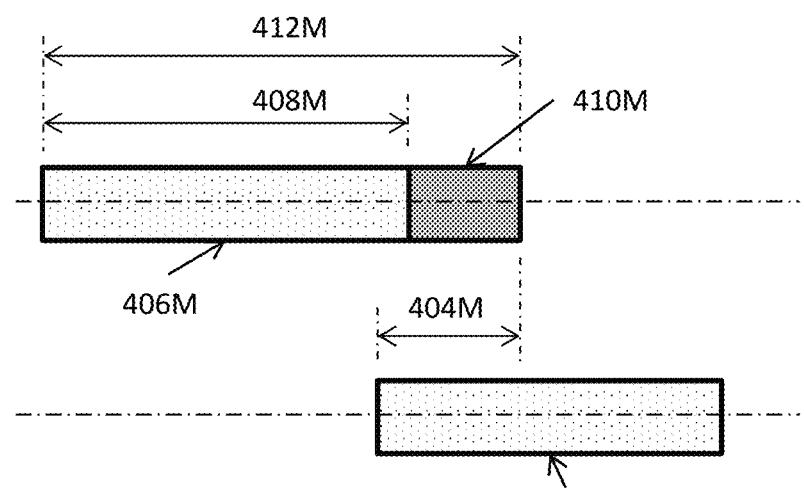
FIG. 4M illustrates the automatic application of some techniques described herein to implement a parallel fill to a shape to satisfy an opposing end of line keep-out design rule in some embodiments.

FIG. 4M illustrates the automatic application of some techniques described herein to implement a parallel fill to a shape to satisfy an opposing end of line keep-out design rule in some embodiments. More specifically, FIG. 4M illustrates a portion of a simplified layout including the first shape 402M. The opposing end of line keep-out design rule requires two opposing ends of two shapes on two separate routing tracks to be at a minimum spacing value indicated by 404M. The portion of the simplified layout also includes the second shape 406M having its original length 408M. The portion including the first shape 402M and the original second shape 406M violates the opposing end of line keep-out rule.

The parallel fill mechanism may implement a parallel fill shape 410M for the second shape 406M along the same routing track to extend its original length 408M to the combined length 412M that satisfies both the minimum length design rule and the opposing end of line keep-out design rule. The parallel fill mechanism may direct perform the parallel fill operation to add the parallel fill shape 410M or present it as a hint or suggestion. The parallel fill shape 410M satisfies the governing design rules and thus may be presented with a different graphical emphasis to distinguish from DRC marks or proposed parallel fill shapes that do not satisfy all the governing design rules of interest.

Figure 4N:
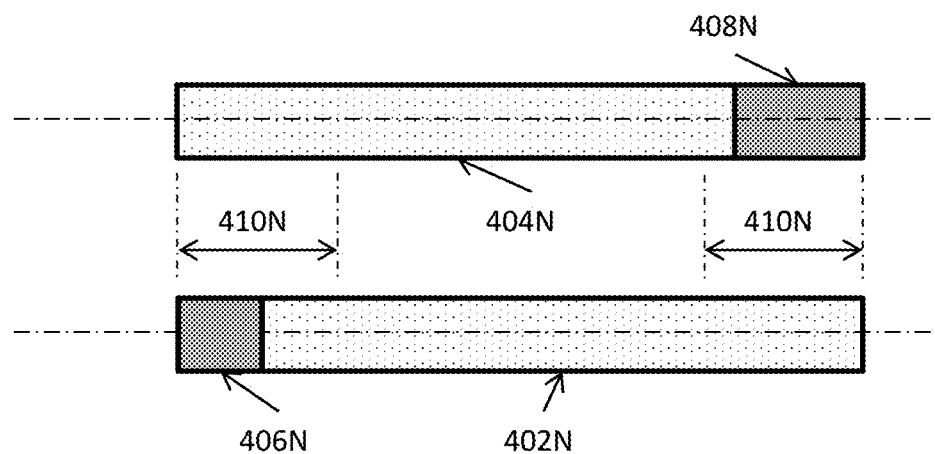
FIG. 4N illustrates the automatic application of some techniques described herein to implement parallel fills to two shapes to satisfy an end of line keep-out design rule in some embodiments.

FIG. 4N illustrates the automatic application of some techniques described herein to implement parallel fills to two shapes to satisfy an end of line keep-out design rule in some embodiments. More specifically, FIG. 4N illustrates a portion of a simplified layout including the first shape 402N and the second shape 404N where both ends of both shapes are not aligned and violate the end of line keep-out design rule that require two ends of two shapes on two adjacent tracks to be at some spacing value apart as indicated by 410N. The parallel fill mechanism may add parallel fill shapes 406N and 408N in light of the end of line keep-out design rule to automatically satisfy this design rule. In this particular example, the parallel fill mechanism may align the two pairs of ends of the first and the second shapes to satisfy the end of line keep-out design rule.

Figure 4O:
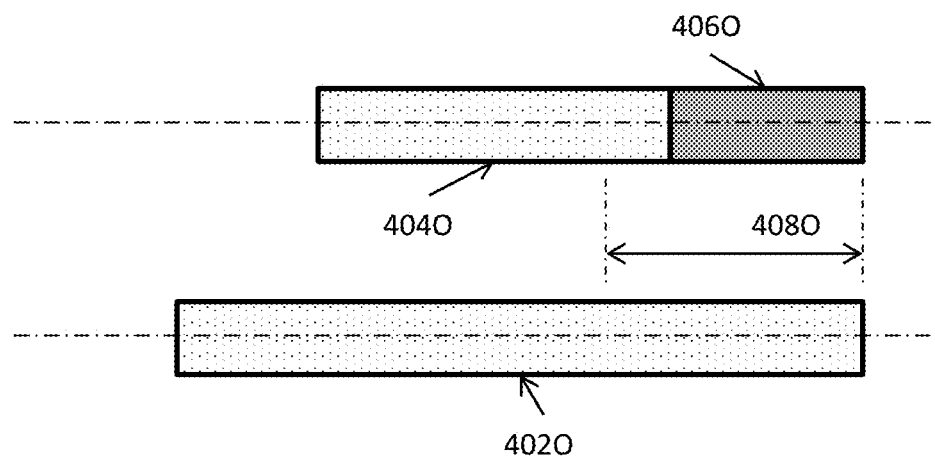
FIGS. 4O-P illustrate the automatic application of some techniques described herein to implement parallel fills to shapes to satisfy an end of line keep-out design rule during interactive editing of a layout portion in some embodiments.
Figure 4P:
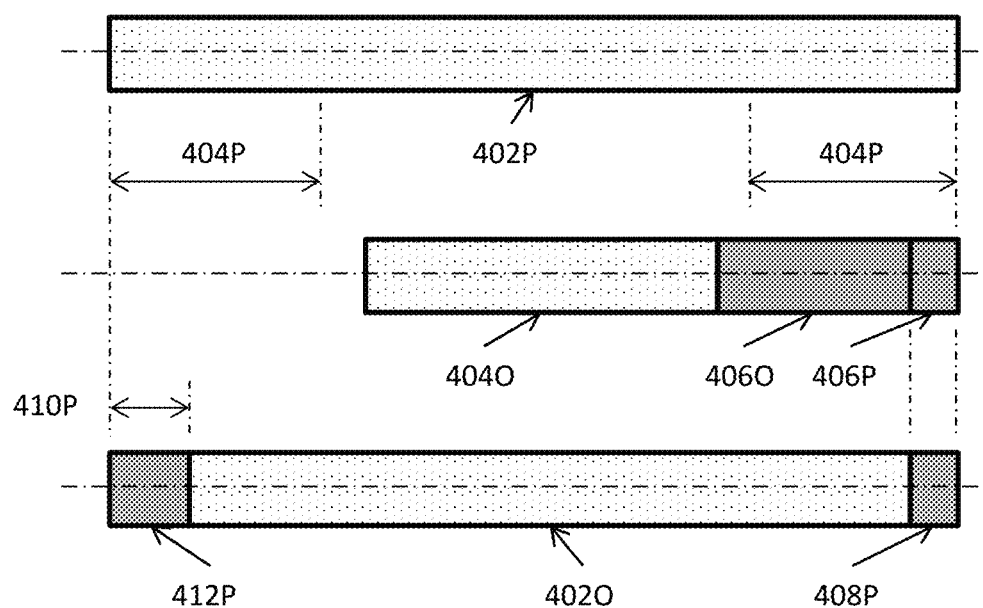
Figure 4Q:
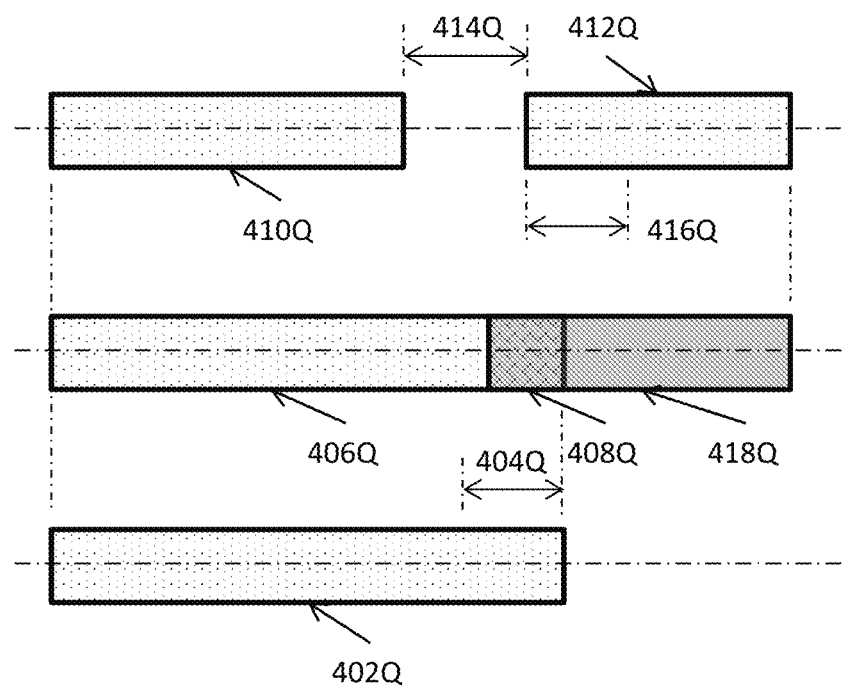
FIG. 4Q illustrates the interaction between multiple applications of the opposing end of line keep-out design rule in a portion of a simplified layout in some embodiments.

FIGS. 4O-P illustrate the automatic application of some techniques described herein to implement parallel fills to shapes to satisfy an end of line keep-out design rule during interactive editing of a layout portion in some embodiments. More specifically, FIG. 4O illustrates a portion of a simplified layout including a first shape 402O on a first routing track. A second shape 404D on a second routing track immediately adjacent to the first routing track is subsequently added to the portion of the simplified layout. For example, a designer may add the second shape 404O to the portion that already includes the first shape 402O.

The second shape 404O is added to the portion in violation of the end of line keep-out design rule in that the right end of the second shape 404D falls within the keep-out distance indicated by 408O. The parallel fill mechanism may implement a parallel fill shape 406O on the second shape 404O with the minimum extension of length to the second shape 404O such that the end of line keep-out design rule is satisfy. Another implementation to satisfy this design rule is to add a longer parallel fill shape 406O such that the right end of the first shape 402O is not within the keep-out distance for the right end of the parallel fill shape 406O. Another possible implementation to satisfy this design rule is to trim the first shape 402O such that the right end of the first shape 402O is aligned with the right end of the second shape 404O.

FIG. 4P continues from FIG. 4O and illustrates the addition of the third shape 402P into the portion of the simplified layout. The introduction of the third shape 402P introduces several violations of the end of line keep-out design rule indicated by the distance 404P from one end of the third shape 402P to a corresponding end of another shape. The first violation occurs between the right end of the third shape 402P and the second shape 404O with the first parallel fill shape 406O. The parallel fill mechanism may implement the second parallel fill shape 406P that effectively further extends the overall length of the second shape 404O by a minimum extension so that the right end of the extended second shape 404O is aligned with the right end of the third shape 402P.

The second violation occurs between the left end of the third shape 402P and the left end of the first shape 402O, assuming the first shape 402O and the third shape 402P are within the range to which the end of line keep-out design rule applies in some embodiments. The parallel fill mechanism may implement another parallel fill shape 412P and along the same first routing track and aggregate the parallel fill shape 412P to the left end of the first shape 402O. The parallel fill shape 412P effectively introduces the minimum extension 410P to the first shape 402O so that the left end of the first shape 402O is aligned with that of the third shape 402P to satisfy the end of line keep-out design rule.

The third violation occurs between the right end of the first shape 402O and that of the second shape 404O or that of the third shape 402P. The parallel fill mechanism may implement another parallel fill shape 408P and along the same first routing track and aggregate the parallel fill shape 408P to the right end of the first shape 402O. The parallel fill shape 408P effectively introduces the minimum extension to the first shape 402O so that the left end of the extended first shape 402O is aligned with that of the extended second shape 404O and that of the third shape 402P to satisfy the end of line keep-out design rule.

FIG. 4Q illustrates the interaction between multiple applications of the opposing end of line keep-out design rule in a portion of a simplified layout in some embodiments. More specifically, FIG. 4Q illustrates a portion of a simplified layout including the first shape 402Q subject to the end of line keep-out design rule indicated by the distance 404Q from the right end of the first shape 402Q. The portion also includes the second shape 406Q, the third shape 410Q, and the fourth shape 412Q that is at an appropriate spacing 414Q from the third shape 410Q. The fourth shape is also subject to the end of line keep-out design rule indicated by the distance 416Q from the left end of the fourth shape 412Q. Upon detection of the violation of the end of line keep-out design rule between the first shape 402Q and the second shape 406Q, the parallel fill mechanism may attempt to implement the parallel fill shape 408Q which effectively extends the second shape 406Q by the minimum extension so that the right end of the first shape 402Q and that of the second shape 406Q are aligned with each other to satisfy the end of line keep-out design rule.

The parallel fill mechanism may nevertheless function in tandem with the DRC mechanism to determine whether the introduction of the parallel fill shape 408Q satisfies one or more other design rules. In this example, the DRC mechanism may determine that the parallel fill shape 408Q may violate the end of line keep-out design rule with the fourth shape 412Q because adding the parallel fill shape 408Q to the second shape 406Q brings the right end of the extended second shape 406Q within the impermissible distance indicated by 416Q as required by the end of line keep-out design rule. In some embodiments, the parallel fill mechanism may present a DRC marker to indicate the possible DRC violation of the pertinent design rule. In some other embodiments, the parallel fill mechanism may implement the parallel fill shape which further extends the second shape 406Q beyond what the parallel fill shape 408Q provides to satisfy the end of line keep-out rule. For example, the parallel fill mechanism may implement the parallel fill shape 418Q which effectively extends the right end of the second shape 406Q to align with that of the fourth shape 412Q while ensuring that the right end of the first shape 402Q and that of the parallel fill shape 418Q also satisfy the end of line keep-out design rule.

Figure 4R:
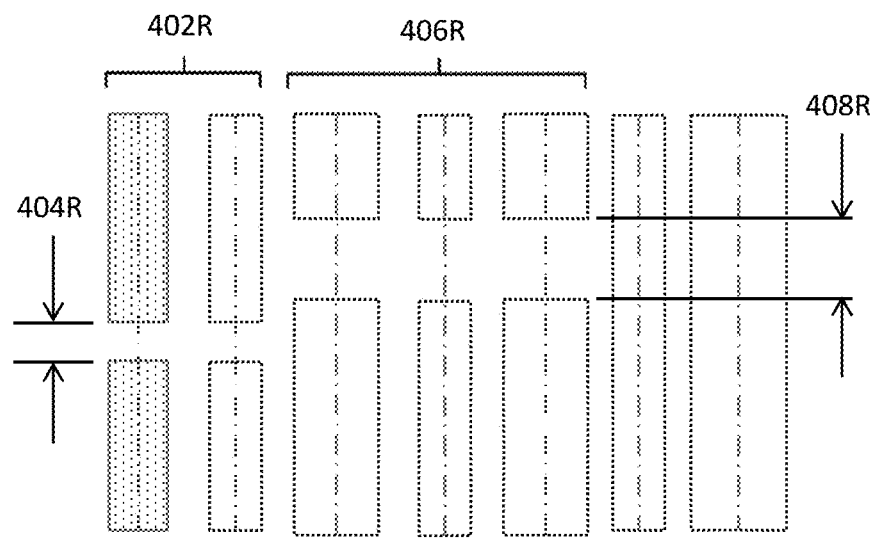
FIGS. 4R-S illustrate the automatic application of some techniques described herein to implement parallel fills to a group of shapes to improve manufacturability of an electronic design by reducing the number of trim masks for an electronic design in some embodiments.
Figure 4S:
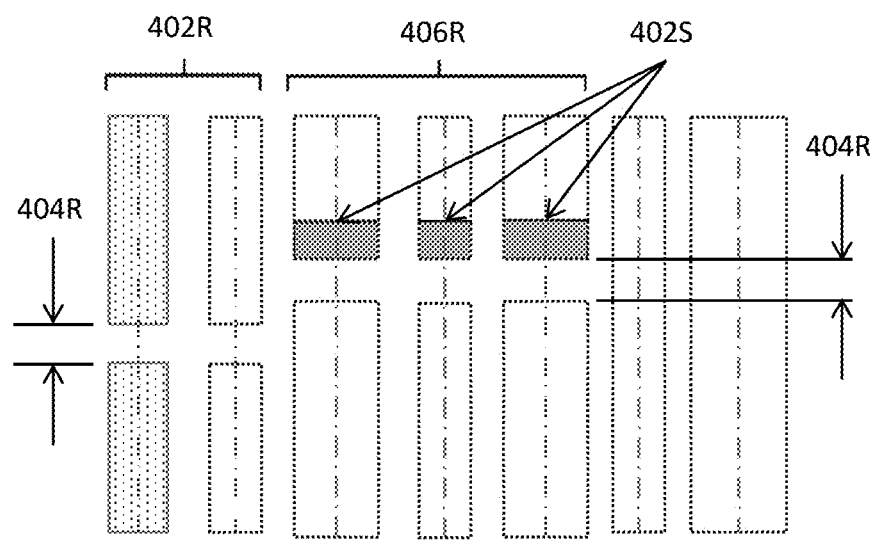

FIGS. 4R-S illustrate the automatic application of some techniques described herein to implement parallel fills to a group of shapes to improve manufacturability of an electronic design by reducing the number of trim masks for an electronic design in some embodiments. More specifically, FIG. 4R illustrates a portion of a simplified layout including a first group of shapes 402R and the second group of shapes 406R. The first group of shapes 402R has the first end of line spacing 404R, and the second group of shapes 406R has the second end of line spacing 408R that is different from the first end of line spacing 404R.

FIG. 4S illustrates the operation of implementing at least a portion of a layout with a criterion for a more structured layout in some embodiments. In these embodiments, the parallel fill mechanism may implement three parallel fill shapes 402S for the second group of shapes 406R to effectively bring the end of line spacing in the second group 406R to the same spacing 404R for the first group of shapes 402R while accounting for one or more other design rules. With these parallel fill shapes 402S, the first trim mask feature for manufacturing the first group of shapes 402R has the same width as the second trim mask feature for manufacturing the second group of shapes 406R. These parallel fill shapes 402S thus produce a more structured layout that may be manufactured by more consistent or uniform trim mask features. In some embodiments where not only the width (404R) but also the length of the trim mask features is the same for the first group 402R and the second group 406R, the parallel fill shapes 402S reduces the number of different trim mask features for manufacturing the electronic design and hence produces a more structured layout for the trim mask.

SYSTEM ARCHITECTURE OVERVIEW

Figure 5:
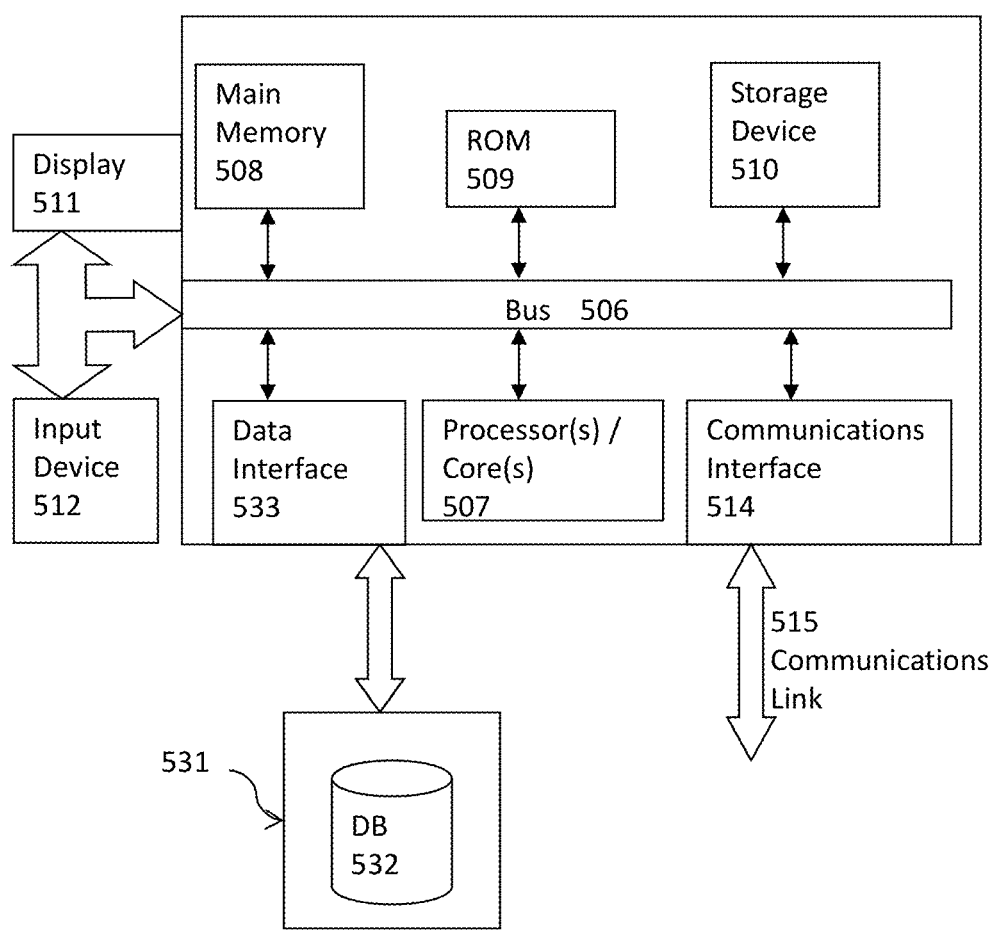
FIG. 5 illustrates a computerized system on which a method for implementing DRC clean multi-patterning process nodes with parallel fills in electronic designs may be implemented.

FIG. 5 illustrates a block diagram of an illustrative computing system 500 suitable for implementing DRC clean multi-patterning process nodes with parallel fills in electronic designs as described in the preceding paragraphs with reference to various figures. Computer system 500 includes a bus 506 or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown).

According to one embodiment, computing system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A mechanisms described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, i.e., application code, through communication link 515 and communication interface 514. Received program code may be executed by processor 507 as it is received, and/or stored in disk drive 510, or other non-volatile storage for later execution. In an embodiment, the computing system 500 operates in conjunction with a data storage system 531, e.g., a data storage system 531 that includes a database 532 that is readily accessible by the computing system 500. The computing system 500 communicates with the data storage system 531 through a data interface 533. A data interface 533, which is coupled with the bus 506, transmits and receives electrical, electromagnetic or optical signals that include data streams representing various types of signal information, e.g., instructions, messages and data. In embodiments of the invention, the functions of the data interface 533 may be performed by the communication interface 514.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing DRC (design rule check) clean parallel fills in electronic designs, comprising:
   identifying, at a design traversal module including or coupled with at least one micro-processor of a computing system, a first shape and one or more neighboring shapes of the first shape by searching design data of a region of a layout of an electronic design;
   classifying the first shape and the one or more neighboring shapes by examining respective characteristics of the first shape and the one or more neighboring shapes to categorize the first shape and the one or more neighboring shapes into one or more classes of a plurality of classes based in part or in whole upon one or more criteria;
   implementing one or more parallel fill shapes for at least one shape of the first shape and the one or more neighboring shapes by aggregating the one or more parallel fill shapes to the at least one shape based in part or in whole upon the one or more classes while satisfying one or more design rules, wherein a parallel fill shape of the one or more parallel fill shapes is implemented on the at least one shape along a direction parallel to one edge of the at least one shape; and
   performing one or more post-layout operations on the layout including the one or more parallel fill shapes by preparing the layout for manufacturing.

2. The computer implemented method of claim 1, further comprising:
   identifying the one or more neighboring shapes by examining the design data within a range or halo around the first shape in the region.

3. The computer implemented method of claim 1, further comprising:
   transforming the first shape and the one or more neighboring shapes into multiple objects having reduced dimensionality design data.

4. The computer implemented method of claim 3, the act of transforming the first shape and the one or more neighboring shapes into the multiple objects comprising:
   determining slices and zero or more existing sliced line segments in the region;
   identifying one or more slices to which the first shape belongs by examining the design data of the first shape and slice lines corresponding to the one or more slices; and determining the multiple objects by projecting ends of the first shape onto a reference line to create projected ends for the first shape along the reference line.

5. The computer implemented method of claim 4, the act of transforming the first shape and the one or more neighboring shapes into the multiple objects comprising:
decomposing an existing sliced line segment determined to exist by partitioning the existing sliced line segment into two or more sliced line sub-segments with at least one of the projected ends of the first shape; and
updating dictionary entries by using data associated with the two or more sliced line sub-segments to update a shape dictionary.

6. The computer implemented method of claim 4, the act of transforming the first shape and the one or more neighboring shapes into the multiple objects comprising:
transforming one or more design rules into one or more transformed design rules by converting the one or more design rules to operate upon the design data having reduced dimensionality than the design data of the first shape or the one or more neighboring shapes.

7. The computer implemented method of claim 6, further comprising:
identifying an optimization target shape by examining the design data of the first shape and the one or more neighboring shape in the region based in part or in whole upon one or more optimization criteria;
determining an object having the reduced dimensionality design data than the design data of first shape or the one or more neighboring shapes by examining the multiple objects to identify the object that corresponds to the optimization target shape; and
identifying one or more first dictionary entries for the object by examining a shape dictionary to locate the one or more first dictionary entries with a correlation or association with the object or the optimization shape.

8. The computer implemented method of claim 7, further comprising:
identifying the one or more neighboring shapes within a range or halo of the optimization target and the one or more classes of the one or more neighboring shapes; and
identifying one or more neighboring objects for the one or more neighboring shapes and the reduced dimensionality design data corresponding to the one or more neighboring objects.

9. The computer implemented method of claim 8, further comprising:
identifying the one or more transformed design rules; and
identifying a first object from the object and the one or more neighboring objects by applying the one or more transformed design rules to the reduced dimensionality design data of the object and the one or more neighboring objects to select the first object that violates at least one of the one or more transformed design rules.

10. The computer implemented method of claim 1, further comprising:
determining whether the one or more parallel fill shapes satisfy one or more additional design rules; and
presenting one or more hints or suggestions in a user interface on a display apparatus using results of determining whether the one or more parallel fill shapes satisfy one or more additional design rules.

11. The computer implemented method of claim 1, further comprising:
identifying one or more criteria for a structured layout for the electronic design;
identifying a plurality of groups of shapes; and
identifying different values for a common characteristic of each group of a plurality of groups of features, wherein the common characteristic includes a trim mask feature characteristic that is referenced in each group of the plurality of groups of shapes.

12. The computer implemented method of claim 11, further comprising:
modifying at least one group of shapes of the plurality of groups to reduce a total number of the different values for the common characteristic.

13. A system for implementing DRC (design rule check) clean multi-patterning process nodes with parallel fills in electronic designs, comprising:
a plurality of modules, at least one of which comprises at least one microprocessor including one or more processor cores executing one or more threads in a computing system;
a non-transitory computer accessible storage medium storing thereupon program code that includes a sequence of instructions that, when executed by the at least one micro-processor or processor core of a computing system, causes the at least one micro-processor or processor core at least to:
identify, at a design traversal module coupled with at least one micro-processor of a computing system, a first shape and one or more neighboring shapes of the first shape by searching design data of a region of a layout of an electronic design;
classify the first shape and the one or more neighboring shapes by examining respective characteristics of the first shape and the one or more neighboring shapes to categorize the first shape and the one or more neighboring shapes into one or more classes of a plurality of classes based in part or in whole upon one or more criteria;
implement one or more parallel fill shapes for at least one shape of the first shape and the one or more neighboring shapes by aggregating the one or more parallel fill shapes to the at least one shape based in part or in whole upon the one or more classes while satisfying one or more design rules, wherein a parallel fill shape of the one or more parallel fill shapes is implemented on the at least one shape along a direction parallel to one edge of the at least one shape; and
perform one or more post-layout operations on the layout including the one or more parallel fill shapes by preparing the layout for manufacturing.

14. The system of claim 13, wherein the non-transitory computer accessible storage medium holds the program code, and the program code includes further instructions that, when executed by the at least one micro-processor or processor core, cause the at least one processor or processor core to:
transform the first shape and the one or more neighboring shapes into multiple objects having reduced dimensionality design data.

15. The system of claim 14, wherein the non-transitory computer accessible storage medium holds the program code, and the program code includes further instructions that, when executed by the at least one processor or processor core, causes the at least one micro-processor or processor core to:
determine slices and zero or more existing sliced line segments in the region;

identify one or more slices to which the first shape belongs by examining the design data of the first shape and slice lines corresponding to the one or more slices;

determine the multiple objects by projecting ends of the first shape onto a reference line to create projected ends for the first shape along the reference line;

decompose an existing sliced line segment determined to exist by partitioning the existing sliced line segment into two or more sliced line sub-segments with at least one of the projected ends of the first shape; and update dictionary entries by using data associated with the two or more sliced line sub-segments to update a shape dictionary.

16. The system of claim 14, wherein the non-transitory computer accessible storage medium holds the program code, and the program code includes further instructions that, when executed by the at least one processor or processor core, causes the at least one micro-processor or processor core to:

transform one or more design rules into one or more transformed design rules by converting the one or more design rules to operate upon the design data having reduced dimensionality than the design data of the first shape or the one or more neighboring shapes;

identify an optimization target shape by examining the design data of the first shape and the one or more neighboring shape in the region based in part or in whole upon one or more optimization criteria;

determine an object having the reduced dimensionality design data than the design data of first shape or the one or more neighboring shapes by examining the multiple objects to identify the object that corresponds to the optimization target shape; and identify one or more first dictionary entries for the object by examining a shape dictionary to locate the one or more first dictionary entries with a correlation or association with the object or the optimization shape.

17. The system of claim 16, wherein the non-transitory computer accessible storage medium holds the program code, and the program code includes further instructions that, when executed by the at least one processor or processor core, causes the at least one micro-processor or processor core to:

identify the one or more neighboring shapes within a range or halo of the optimization target and the one or more classes of the one or more neighboring shapes;

identify one or more neighboring objects for the one or more neighboring shapes and the reduced dimensionality design data corresponding to the one or more neighboring objects;

identifying the one or more transformed design rules; and identifying a first object from the object and the one or more neighboring objects by applying the one or more transformed design rules to the reduced dimensionality design data of the object and the one or more neighboring objects to select the first object that violates at least one of the one or more transformed design rules.

18. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing DRC (design rule check) clean multi-patterning process nodes with parallel fills in electronic designs, the set of acts comprising:

identifying, at a design traversal module coupled with at least one micro-processor of a computing system, a first shape and one or more neighboring shapes of the first shape by searching design data of a region of a layout of an electronic design;

classifying the first shape and the one or more neighboring shapes by examining respective characteristics of the first shape and the one or more neighboring shapes to categorize the first shape and the one or more neighboring shapes into one or more classes of a plurality of classes based in part or in whole upon one or more criteria;

implementing one or more parallel fill shapes for at least one shape of the first shape and the one or more neighboring shapes by aggregating the one or more parallel fill shapes to the at least one shape based in part or in whole upon the one or more classes while satisfying one or more design rules, wherein a parallel fill shape of the one or more parallel fill shapes is implemented on the at least one shape along a direction parallel to one edge of the at least one shape; and performing one or more post-layout operations on the layout including the one or more parallel fill shapes by preparing the layout for manufacturing.

19. The article of manufacture of claim 18, the set of acts further comprising:

determining whether the one or more parallel fill shapes satisfy one or more additional design rules; and presenting one or more hints or suggestions in a user interface on a display apparatus using results of determining whether the one or more parallel fill shapes satisfy one or more additional design rules.

20. The article of manufacture of claim 18, the set of acts further comprising:

identifying one or more criteria for a structured layout for the electronic design; and identifying a plurality of groups of shapes; and identifying different values for a common characteristic of each group of a plurality of groups of features, wherein the common characteristic includes a trim mask feature characteristic that is referenced in each group of the plurality of groups of shapes.

* * * * *